(12) United States Patent
Yabuta et al.

(10) Patent No.: US 8,797,297 B2
(45) Date of Patent: Aug. 5, 2014

(54) DISPLAY DEVICE

(75) Inventors: Kohji Yabuta, Osaka (JP); Mikihiro Noma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 13/640,294

(22) PCT Filed: Jan. 26, 2011

(86) PCT No.: PCT/JP2011/051490
§ 371 (c)(1),
(2), (4) Date: Oct. 9, 2012

(87) PCT Pub. No.: WO2011/129131
PCT Pub. Date: Oct. 20, 2011

(65) Prior Publication Data
US 2013/0027354 A1    Jan. 31, 2013

(30) Foreign Application Priority Data
Apr. 12, 2010 (JP) ................................ 2010-091665

(51) Int. Cl.
*G06F 3/041* (2006.01)
*G06F 3/042* (2006.01)
*G09G 3/34* (2006.01)

(52) U.S. Cl.
CPC .............. *G06F 3/042* (2013.01); *G09G 3/3406* (2013.01)
USPC ............................ 345/175; 345/173; 345/102

(58) Field of Classification Search
None
See application file for complete search history.

(56) References Cited

U.S. PATENT DOCUMENTS

| | | |
|---|---|---|
| 2007/0296688 A1 | 12/2007 | Nakamura et al. |
| 2008/0252618 A1 | 10/2008 | Chung et al. |
| 2009/0102989 A1 | 4/2009 | Sakai et al. |
| 2009/0128508 A1* | 5/2009 | Sohn et al. ..................... 345/173 |
| 2009/0159786 A1 | 6/2009 | Yang et al. |
| 2011/0199338 A1* | 8/2011 | Kim ............................. 345/175 |
| 2011/0291993 A1* | 12/2011 | Miyazaki et al. ............. 345/175 |

FOREIGN PATENT DOCUMENTS

| | | |
|---|---|---|
| JP | 2004-272931 A | 9/2004 |
| JP | 2008-3296 A | 1/2008 |
| JP | 2008-83677 A | 4/2008 |
| JP | 2009-169390 A | 7/2009 |
| JP | 2009-252012 A | 10/2009 |
| WO | 2007/138732 A1 | 12/2007 |

* cited by examiner

*Primary Examiner* — Joseph Haley
(74) *Attorney, Agent, or Firm* — Chen Yoshimura LLP

(57) ABSTRACT

Disclosed is a liquid crystal display device (1) that is provided with a function of identifying the position of a subject to be detected (finger) in an image display region (12*b*) of a liquid crystal panel (10) by emitting light to the image display region (12*b*) and by detecting light reflected by the subject to be detected (finger). The liquid crystal display device is provided with a backlight (30) and a front light-emitting unit (40), which radiate light to the image display region (12*b*). The backlight (30) is disposed on the side of the liquid crystal panel (10) opposite to the image display surface (10*a*), and emits light to the image display region (12*b*) from the rear side of the liquid crystal panel (10). The front light-emitting unit (40) is disposed outside of the image display region (12*b*), and emits light to the image display region (12*b*) without having the liquid crystal panel (10) therebetween. With such a configuration, even when the subject to be detected and the display panel are apart from each other, the position of the subject to be detected can be accurately identified.

10 Claims, 22 Drawing Sheets

Distance L From Image Display Surface (mm)

DISPLAY DEVICE

TECHNICAL FIELD

The present invention relates to a display device equipped with a function of identifying a position of a subject to be detected in an image display region of a display panel by radiating light to the image display region and by detecting light reflected by the subject to be detected.

BACKGROUND ART

In display devices such as liquid crystal display devices, a touch panel equipped display device having a touch panel function has been developed. The touch panel equipped display device is capable of detecting a touch position (coordinates) when a panel surface thereof is touched by a subject to be detected (finger or input stylus).

Traditionally, as such a touch panel equipped display device (referred to as a display device below), a display device equipped with a touch panel of a so-called resistive type, capacitive type, or the like has been mainly used. However, this type of display device requires a special panel for position detection, for example, which causes the entire device to be thicker. Also, because the touch panel is disposed in a screen (display region) of the display device, a problem of lower visibility arises.

To address these problems, in recent years, a display device with built-in coordinate sensors, which has light-receiving elements (photo sensors) such as photodiodes or phototransistors incorporated in a screen of the display device, has been developed to replace the above-mentioned resistive or capacitive touch panel.

The display device with built-in optical coordinate sensors is described in Patent Document 1, for example.

FIG. 21 shows a schematic configuration of a liquid crystal display device described in Patent Document 1.

As shown in this figure, in the liquid crystal display device described in Patent Document 1, a distribution of received light intensities, which were changed as a result of a subject to be detected such as a finger blocking ambient light or as a result of the subject to be detected blocking or reflecting invisible light that was radiated to a liquid crystal panel 220 from a backlight 210, is detected by light-receiving elements 221 formed in the liquid crystal panel 220 in a matrix, thereby detecting the position (coordinates) of the subject to be detected. The backlight 210 has a light source unit 213 and a light guide plate 214, and the light source unit 213 has a visible light source 211 made of white LEDs (Light Emitting Diodes) and an infrared light source 212 made of infrared LEDs as an invisible light source. The light-receiving elements 221 are provided for respective elements (pixels) 222 with a ratio of one to one or one to several.

RELATED ART DOCUMENT

Patent Document

Patent Document 1: Japanese Patent Application Laid-Open Publication No. 2008-3296 (Published on Jan. 10, 2008)

SUMMARY OF THE INVENTION

Problems to be Solved by the Invention

However, in the above-mentioned liquid crystal display device, the infrared light source 212 is disposed on a side opposite to an image display surface of the liquid crystal panel 220, and infrared light is radiated to the image display region from the rear surface side of the liquid crystal panel 220. Therefore, when the distance from the infrared light source 212 to the subject to be detected is made greater, the intensity of the infrared light (IR intensity) in the image display region becomes smaller, and the intensity of the light (received light intensity) that reaches the light-receiving elements 221 after being reflected by the subject to be detected becomes smaller. This makes it difficult to accurately identify the position of the subject to be detected.

FIG. 22 shows an example of a relationship between the distance L from the image display surface of the display panel to the subject to be detected and the infrared light intensity (IR intensity) at the distance L. As shown in this figure, the greater the distance L from the image display surface to the subject to be detected is, the smaller the IR intensity becomes. When the distance L from the image display surface of the display panel to the subject to be detected is 3 mm, for example, the IR intensity is 1070 µW, but when the distance L from the image display surface of the display panel to the subject to be detected is 40 mm, the IR intensity is lowered to 665 µW. As described, when the subject to be detected is in contact with or near the display panel, the sufficient IR intensity can be obtained, allowing the accurate position to be identified, but when the subject to be detected is further away from the display panel, the sufficient IR intensity cannot be obtained, which makes it difficult to identify the accurate position.

The present invention was made in view of the above-mentioned problems, and is aiming at providing a display device that can accurately identify the position of a subject to be detected even when the subject to be detected and a display panel are apart from each other.

Means for Solving the Problems

In order to solve the above-mentioned problems, a display device according to the present invention has a function of identifying a position of a subject to be detected in an image display region of a display panel by radiating light to the image display region and by detecting light reflected by the subject to be detected, including: a first light-emitting unit and a second light-emitting unit that radiate light to the image display region, wherein the first light-emitting unit is disposed on a side opposite to an image display surface of the display panel, and radiates light to the image display region from a rear surface side of the display panel, and wherein the second light-emitting unit is disposed outside of the image display region, and radiates light to the image display region without having the display panel therebetween.

In this configuration, in addition to light from the first light-emitting unit, light from the second light-emitting unit is radiated to the image display region. The light emitted from the second light-emitting unit enters the image display region without passing through the display panel. This makes it possible to increase the light intensity in the image display region (see FIG. 7) as compared with the conventional configuration (see FIGS. 21 and 22). Therefore, the intensity of light reflected by the subject to be detected (reflected light of the light from the first light-emitting unit and reflected light of the light from the second light-emitting unit) becomes sufficient both in a region where the distance between the image display surface and the subject to be detected is small and in a region where the distance is great. Thus, even when the subject to be detected and the display panel are apart from each other, the position of the subject to be detected can be accurately identified.

The display device of the present invention may also be configured such that the first light-emitting unit has a light source for image display and a first light source that radiates light to the image display region for identifying the position of a subject to be detected.

The display device of the present invention may also be configured such that the second light-emitting unit has one or more second light sources that radiate light to the image display region for identifying the position of a subject to be detected.

The display device of the present invention may also be configured such that the second light-emitting unit includes a plurality of second light sources, and the respective second light sources are disposed at the respective corners in the periphery of the image display region.

The display device of the present invention may also be configured such that the respective second light sources are disposed in a manner that light from the second light sources travels across the image display region.

The display device of the present invention may also be configured such that the second light-emitting unit further includes a light guide member outside of the image display region, wherein the second light source emits light to the light guide member, and wherein the light guide member emits light from the second light source through an emitting surface of the light guide member toward the image display region.

The display device of the present invention may also be configured such that the light guide member is disposed along each side of the image display region so as to enclose the image display region.

In the above-mentioned configuration, the light emitted from the second light-emitting unit travels inside the light guide member, exits through the emitting surface of the light guide member, and enters the image display region. The light guide member is disposed along each side of the image display region so as to enclose the image display region. This way, uniform light can be emitted to the image display region from the periphery of the image display region, and therefore, the position of the subject to be detected can be identified more accurately regardless of the position thereof in the horizontal direction (position within the X-Y plane that is parallel with the image display surface).

In the display device of the present invention, it is preferable that the first light source be an infrared light source that radiates infrared light.

In the display device of the present invention, it is preferable that the second light source be an infrared light source that radiates infrared light.

Because the infrared light passes through the display panel regardless of image display state (visible light transmittance), it is possible to avoid the problem of insufficient light intensity for the position detection that occurs when the display screen is dark.

The display device of the present invention may also be configured such that the display panel displays stereoscopic images.

In the display device of the present invention, because the position of the subject to be detected (finger of a user of the display device or the like) can be accurately identified even in a region remote from the image display surface of the display panel, it is possible to accurately identify the position of the subject to be detected (finger or input stylus) as intended by the user when the user recognizes the stereoscopic image and gives instructions thereto.

The display device of the present invention may also be configured such that a display mode of the display panel switches between a first display mode for displaying planar images and a second display mode for displaying stereoscopic images.

In the display device of the present invention, by detecting light that was emitted from the first light-emitting unit and the second light-emitting unit and that was reflected by the subject to be detected, the position of the subject to be detected, which is present at a position remote from the display panel in the image display region, can be identified.

Effects of the Invention

As described above, the display device according to the present invention includes the first light-emitting unit and the second light-emitting unit that radiate light to the image display region. The first light-emitting unit is disposed on the side opposite to the image display surface of the display panel, and emits light to the image display region from the rear surface side of the display panel. The second light-emitting unit is disposed outside of the image display region, and emits light to the image display region without having the display panel therebetween. Therefore, the position of a subject to be detected can be accurately identified even when the subject to be detected and the display panel are apart from each other.

BRIEF DESCRIPTION OF THE DRAWINGS

FIGS. 10(a) to 10(e) are schematic diagrams showing specific examples of photo sensor arrangement.

FIG. 13(a) is a schematic diagram of a scan image when reflection light is radiated to a single pixel, and FIG. 13(b) is a schematic diagram of a scan image when reflection light is radiated to a plurality of pixels.

FIG. 20(a) shows an effect of the parallax barrier providing viewing angles, and FIG. 20(b) shows observed regions on a 3D display screen.

DETAILED DESCRIPTION OF EMBODIMENTS

An embodiment of the present invention will be explained below with reference to figures.

In the present embodiment, a liquid crystal display device having a touch panel function (referred to as a liquid crystal display device below) is explained as an example of a display device equipped with a function of identifying (detecting) a position (coordinates) of a subject to be detected (such as an input stylus or a finger of a user of the display device) in an image display region.

Figure 1:
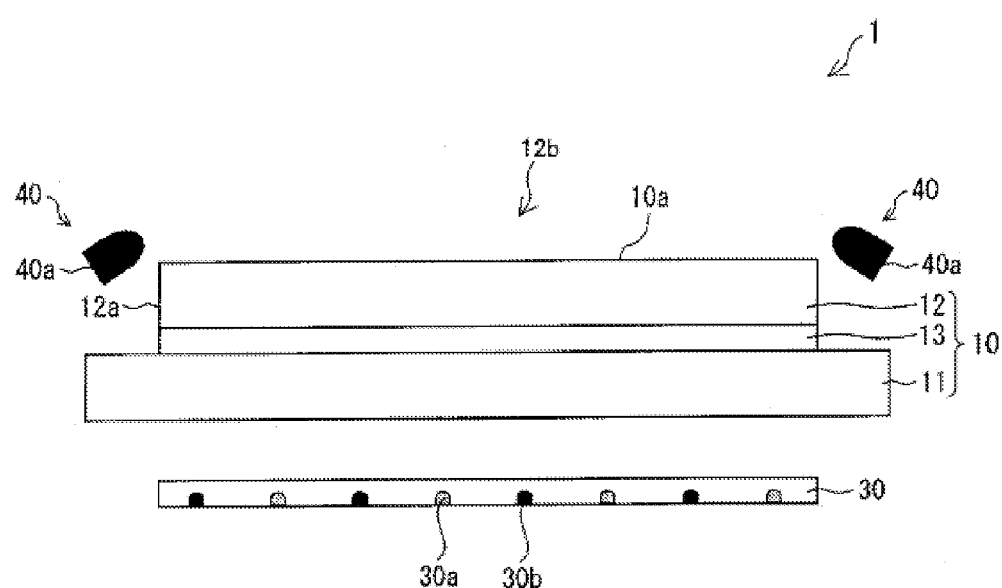
FIG. 1 is a cross-sectional view showing a schematic configuration of a liquid crystal display device according to an embodiment of the present invention.
Figure 2:
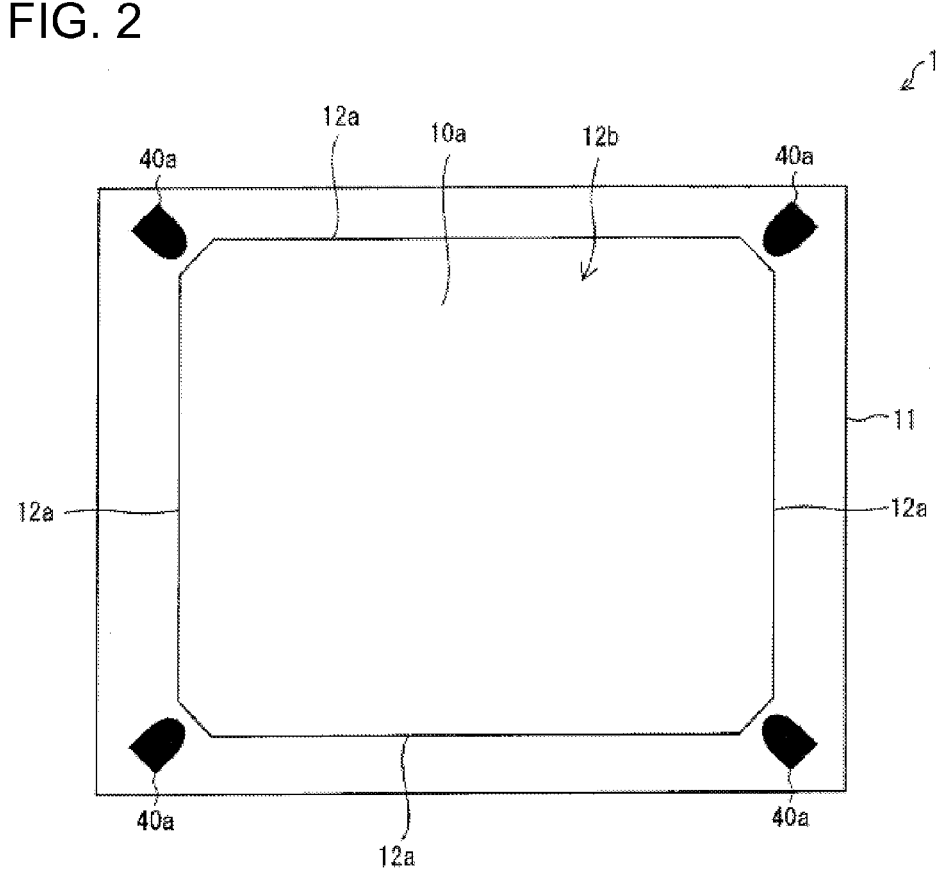
FIG. 2 is a plan view showing a schematic configuration of a liquid crystal display device according to the present embodiment.
Figure 3:
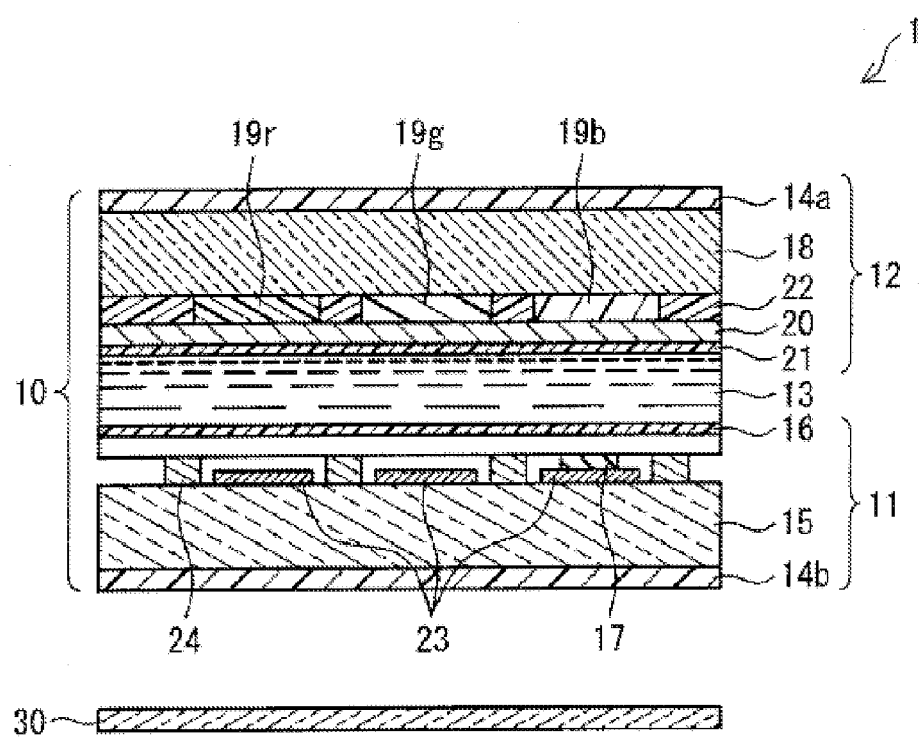
FIG. 3 is a cross-sectional view showing a part of a liquid crystal panel of the liquid crystal display device in FIG. 1 in detail.

FIG. 1 is a cross-sectional view showing a schematic configuration of a liquid crystal display device according to the present embodiment. FIG. 2 is a plan view showing a schematic configuration of the liquid crystal display device according to the present embodiment. FIG. 3 is a cross-sectional view showing a part of a liquid crystal panel in the liquid crystal display device in FIG. 1 in detail.

As shown in FIGS. 1 and 3, a liquid crystal display device 1 of the present embodiment includes a liquid crystal panel 10 (display panel), a backlight 30 (first light-emitting unit), and a front light-emitting unit 40 (second light-emitting unit). In FIG. 3, the front light-emitting unit 40 is omitted for ease of explanation.

The backlight 30 is an illumination device that emits light to the liquid crystal panel 10, and is disposed on the rear surface side of the liquid crystal panel 10. The backlight 30 includes visible light sources 30a for displaying images and light sources 30b (first light sources) for detecting a position (coordinates) of a subject to be detected. The light sources 30b may be separately provided on the rear surface side of the liquid crystal panel 10, instead of being included in the backlight 30.

As the light for the position detection, infrared light, visible light, ultraviolet light, or the like can be used, but because infrared light is transmitted (pass) through the liquid crystal panel 10 regardless of image display state (visible light transmittance), it is possible to avoid the problem of insufficient light intensity for position detection that occurs when the display screen is dark. Therefore, it is preferable to use infrared light as the light for the position detection in the liquid crystal display device 1. Below, an example of using infrared light as the light for the position detection is described, and the light sources 30b are referred to as first infrared light sources 30b in the description.

The liquid crystal panel 10 includes an active matrix substrate 11 (TFT substrate), an opposite substrate 12 (color filter (CF) substrate), a liquid crystal layer 13, polarizing plates 14a and 14b, a protective plate (not shown), and pixels for displaying images arranged in a matrix.

The active matrix substrate 11 and the opposite substrate 12 are disposed so as to face each other through the liquid crystal layer 13. The polarizing plate 14a is provided on an image display side (front side) of the opposite substrate 12, and the polarizing plate 14b is provided on a side (rear side) of the active matrix substrate 11 opposite to the image display side.

The respective polarizing plates 14a and 14b serve as polarizing elements. When liquid crystal materials sealed in the liquid crystal layer 13 are of a vertical alignment type, for example, by disposing the polarizing plate 14a on the front side and the polarizing plate 14b on the rear side such that the respective polarizing directions are in a crossed Nicols state, the liquid crystal panel 10 of a normally black mode can be achieved.

In the active matrix substrate 11, TFTs (not shown) that are switching elements for driving the respective pixels, an alignment film 16, photo sensors 17 (light-receiving elements), pixel electrodes 23, data signal lines 24, and the like are formed on a glass substrate 15.

The photo sensors 17 are made of photodiodes, phototransistors, or the like, and by outputting electric currents or charges in accordance with the intensity of received light to the outside, the received light intensity can be derived. As the photo sensors 17, photo sensors made of a-Si (amorphous silicon), p-Si (polysilicon, polycrystalline silicon), or CG silicon (Continuous Grain Silicon) can be used, for example.

In the opposite substrate 12, a color filter layer 19, an opposite electrode 20, an alignment film 21, and the like are formed on a glass substrate 18. The color filter layer 19 includes colored sections in respective colors of red (R) (19r), green (G) (19g), and blue (B) (19b) and a black matrix 22.

The front light-emitting unit 40 includes four light sources 40a (second light sources) having a bullet shape. As shown in FIGS. 1 and 2, the light sources 40a are disposed at respective corners (four corners) in the periphery (outside) of an image display region 12b on the side surfaces 12a of the opposite substrate 12. There is no special limitation on the number of the light sources 40a as long as at least one light source is provided. Also, the shape of the light sources 40a is not limited to the bullet shape.

As the light of the light sources 40a, infrared light, visible light, ultraviolet light, or the like can be used, but in a manner similar to the light sources 30b, it is preferable to use infrared light. Below, an example of using infrared light as the light of the light sources 40*a* is described, and the light sources 40*a* are referred to as second infrared light sources 40*a* in the description.

Figure 4:
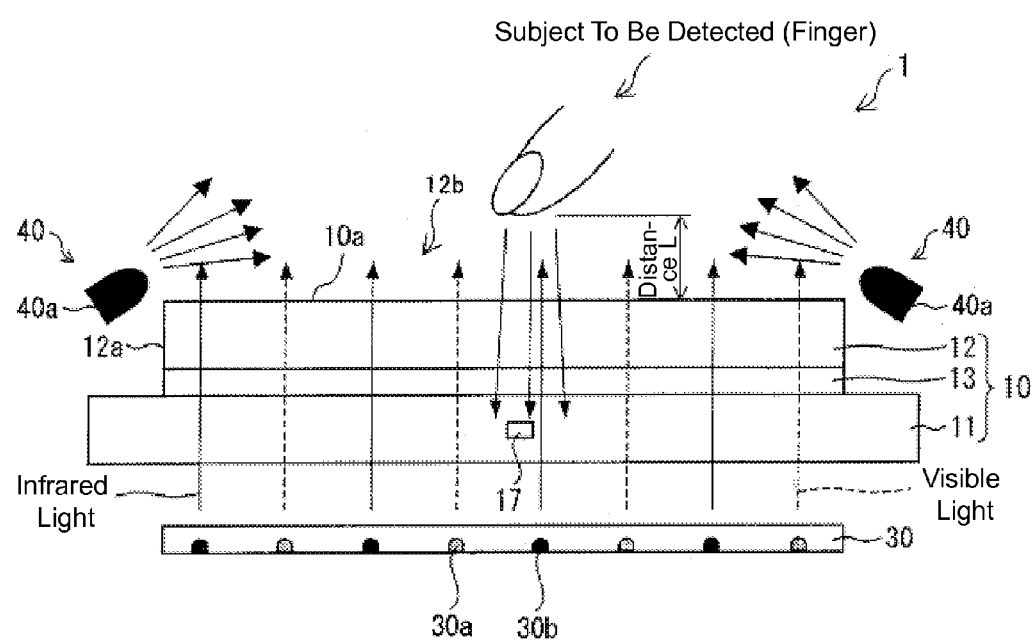
FIG. 4 is a cross-sectional view schematically showing how light emitted from a backlight and light emitted from a second infrared light source of a front light-emitting unit travel in the liquid crystal display device of an embodiment of the present invention.
Figure 5:
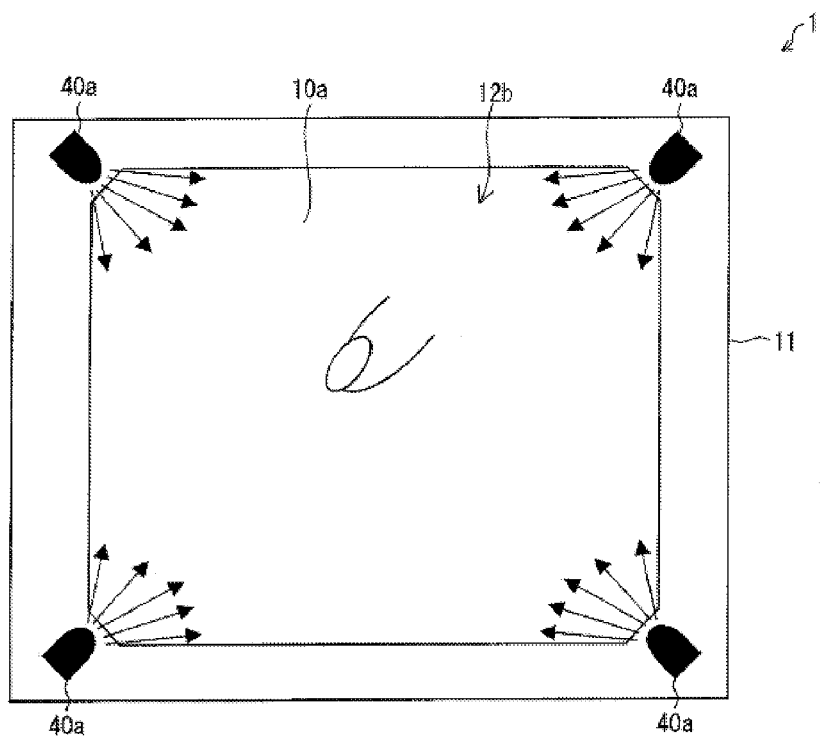
FIG. 5 is a plan view of an image display region in the liquid crystal display device of the present embodiment schematically showing how light emitted from the second infrared light source travels.

Next, how the light travels in the liquid crystal display device 1 will be explained. FIG. 4 is a cross-sectional view schematically showing how the light emitted from the backlight 30 (light emitted from the visible light sources 30*a* and the first infrared light sources 30*b* (first infrared light)) and the light emitted from the second infrared light sources 40*a* of the front light-emitting unit 40 travel. FIG. 5 is a plan view of the image display region 12*b* schematically showing how the light emitted from the second infrared light sources 40*a* travels. In FIGS. 4 and 5, the dashed lines represent visible light (light emitted from the visible light sources 30*a*) and the solid lines represent infrared light.

In the respective second infrared light sources 40*a*, angles of the emitting surfaces thereof are set such that optical axes of respective infrared light beams (second infrared light) emitted therefrom passes through a line that is perpendicular to the liquid crystal panel 10 and that runs through the center of the image display region 12*b*, and travels across the image display region 12*b* (on the side where the subject to be detected is present). FIG. 4 shows an example in which the emergence angle of the optical axis of the second infrared light is set to 45 degrees relative to the image display surface 10*a*. There is no special limitation on the emergence angle, and it may be appropriately set in accordance with the size and shape of the liquid crystal panel 10, the number of the second infrared light sources 40*a*, and the like.

Part of the first infrared light and the second infrared light that entered the image display region 12*b* is reflected by a subject to be detected, and part of the reflected light is received by the photo sensor 17 in the liquid crystal panel.

With this configuration, the infrared light (second infrared light) emitted from the second infrared light sources 40*a* enters the image display region 12*b* without going through (passing through) the liquid crystal panel 10, unlike the infrared light (first infrared light) emitted from the first infrared light sources 30*b*. Therefore, because the attenuation of the IR intensity, which results from the light propagating through the liquid crystal panel 10, does not occur in the second infrared light, the intensity of the second infrared light that entered the image display region 12*b* becomes higher than that of the first infrared light. This allows the reachable area (radiation range) of the infrared light to be expanded in a direction further away from the image display surface 10*a*.

Figure 6:
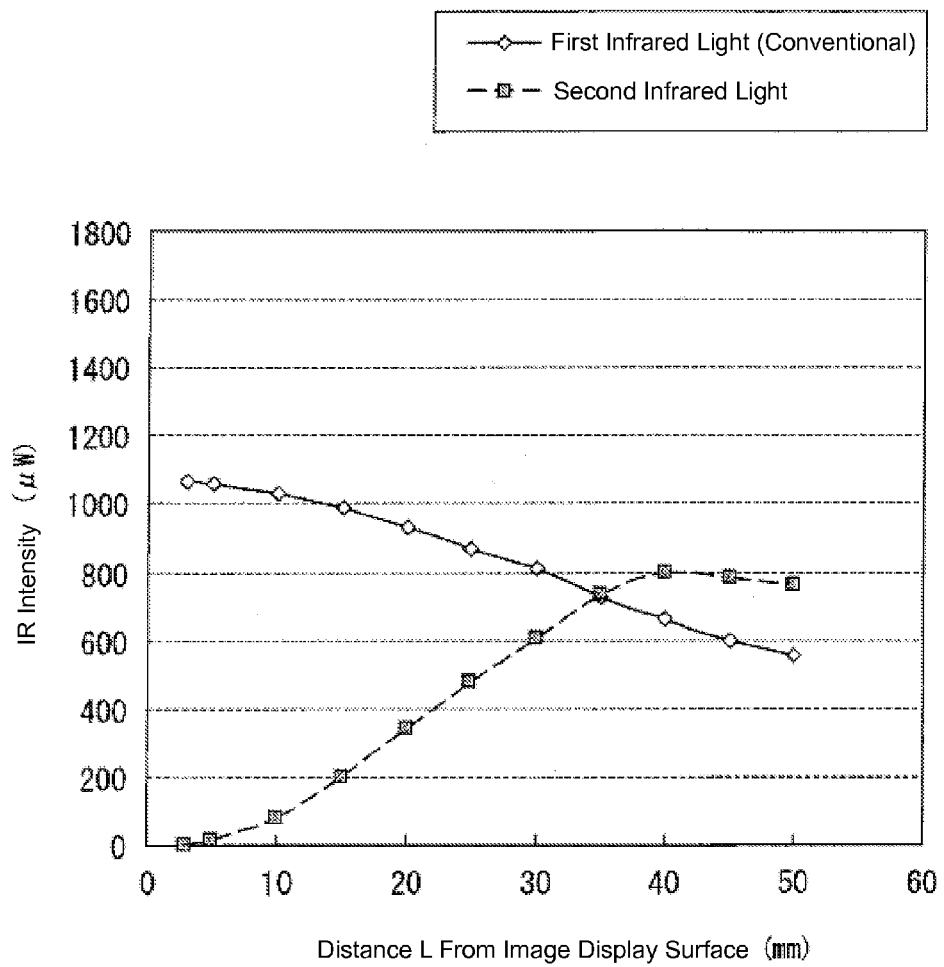
FIG. 6 is a graph showing an example of a relationship between a distance L from an image display surface of the liquid crystal panel and IR intensity of infrared light when photo sensors receive infrared light (reflection light) reflected by a subject to be detected in the liquid crystal display device of an embodiment of the present invention.
Figure 22:
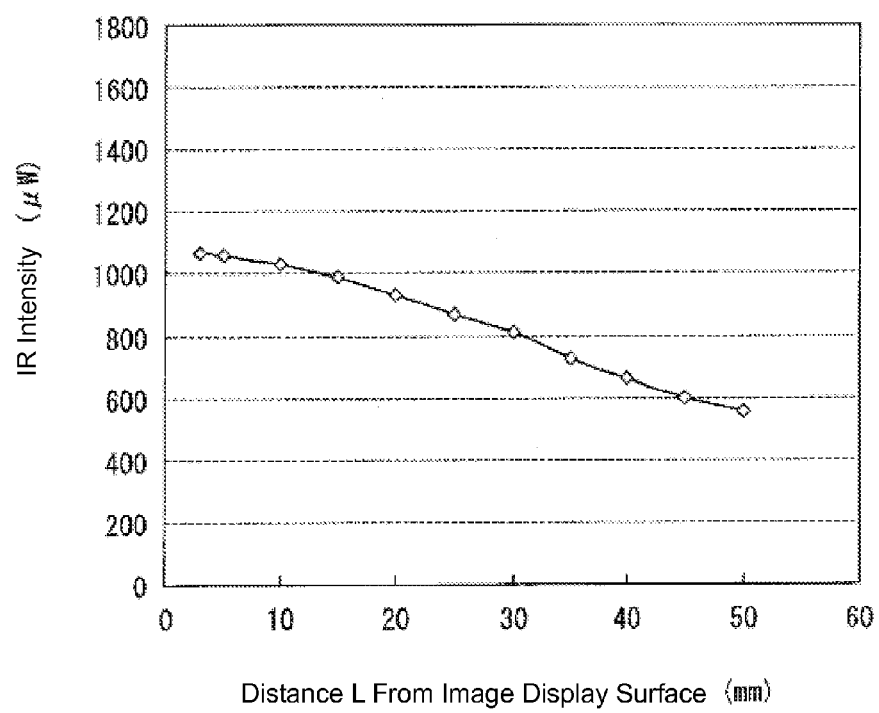
FIG. 22 is a graph showing an example of a relationship between a distance L from an image display surface of a display panel and IR intensity of infrared light when photo sensors receive infrared light (reflection light) reflected by a subject to be detected in a conventional display device.

FIG. 6 is a graph showing an example of a relationship between the distance L from the image display surface 10*a* of the liquid crystal panel 10 and the IR intensity of infrared light at the distance L. In this figure, a comparison between the measurement results of the IR intensity when provided with the first infrared light sources 30*b* only (configuration similar to the conventional configuration; see FIG. 22) and the measurement results of the IR intensity when provided with the second infrared light sources 40*a* only (at the four corners in the periphery of the image display region 12*b*). As shown in this figure, in a region where the distance L from the image display surface 10*a* of the liquid crystal panel 10 to a subject to be detected is great (L>35 mm), the IR intensity of the second infrared light is higher than that of the first infrared light. That is, it is understood that when the second infrared light sources 40*a* are provided, the reachable area (radiation range) of the infrared light is expanded in a direction further away from the image display surface 10*a*.

In a region where the distance L from the image display surface 10*a* to the subject to be detected is small (L<35 mm), which is out of the radiation range of the second infrared light, the IR intensity of the first infrared light is higher than that of the second infrared light. In this graph, the relationship in the IR intensity size between the first infrared light and the second infrared light is reversed after the point where the distance from the image display surface 10*a* to the subject to be detected is 35 mm. However, this border point is changed by adjusting the angle of the emerging direction of the second infrared light sources 40*a*. This graph shows an example in which the emergence angle of the optical axis of the second infrared light emitted from the second infrared light sources 40*a* is set to 45 degrees relative to the image display surface 10*a*.

The liquid crystal display device 1 according to the present embodiment use both the first infrared light sources 30*b* and the second infrared light sources 40*a*. This allows the second infrared light to be radiated to the region where the IR intensity of the first infrared light is low, and as a result, the respective radiation ranges of the two types of light can be compensated with each other. This makes it possible to achieve a sufficient IR intensity regardless of the distance L from the image display surface 10*a* to the subject to be detected.

Figure 7:
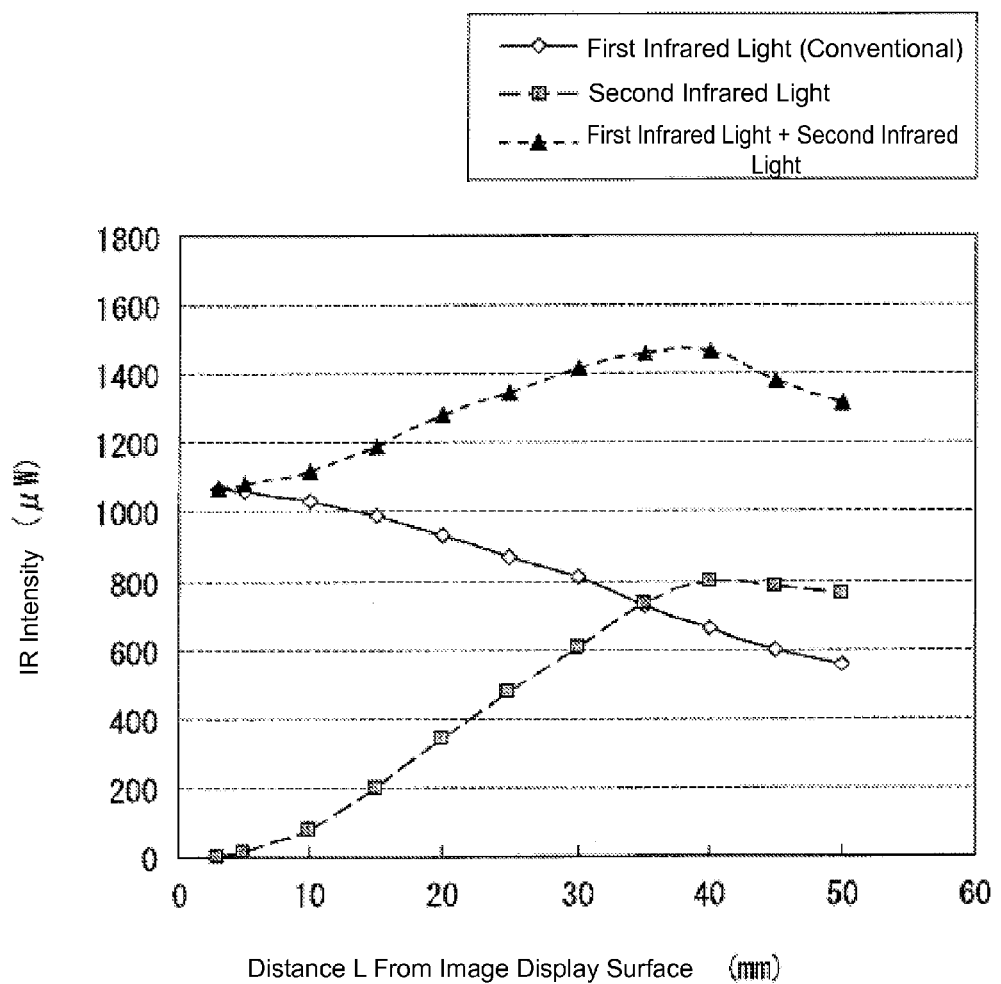
FIG. 7 is a graph obtained by combining the graph shown in FIG. 6 with measurement results of IR intensity of reflection light in a configuration using both a first infrared light source and the second infrared light source (configuration of the liquid crystal display device of an embodiment of the present invention).

FIG. 7 shows a graph obtained by combining the graph shown in FIG. 6 with the measurement results of the IR intensity in the liquid crystal display device 1 according to this embodiment that uses both the first infrared light sources 30*b* and the second infrared light sources 40*a*. As shown in this figure, in the present liquid crystal display device 1, the IR intensity of the infrared light in the image display region 12*b* equals a sum of the IR intensity of the first infrared light and the IR intensity of the second infrared light, and the sufficient IR intensity can be obtained in both regions where the distance L from the image display surface 10*a* to the subject to be detected is small and where the distance L is great, as compared with the configuration provided with the first infrared light sources 30*b* only (configuration similar to the conventional configuration). In this example, in particular, the IR intensity reaches a peak around a point where the distance L is 40 mm. Therefore, even when the subject to be detected is present around the position where the distance L is 40 mm, reflection light with strong intensity is obtained from the subject to be detected, thereby making it possible to accurately identify the position thereof. Thus, even when the subject to be detected and the liquid crystal panel 10 are apart from each other, the position of the subject to be detected can be accurately identified.

Next, features of the liquid crystal display device 1 according to the present embodiment will be explained.

Figure 8:
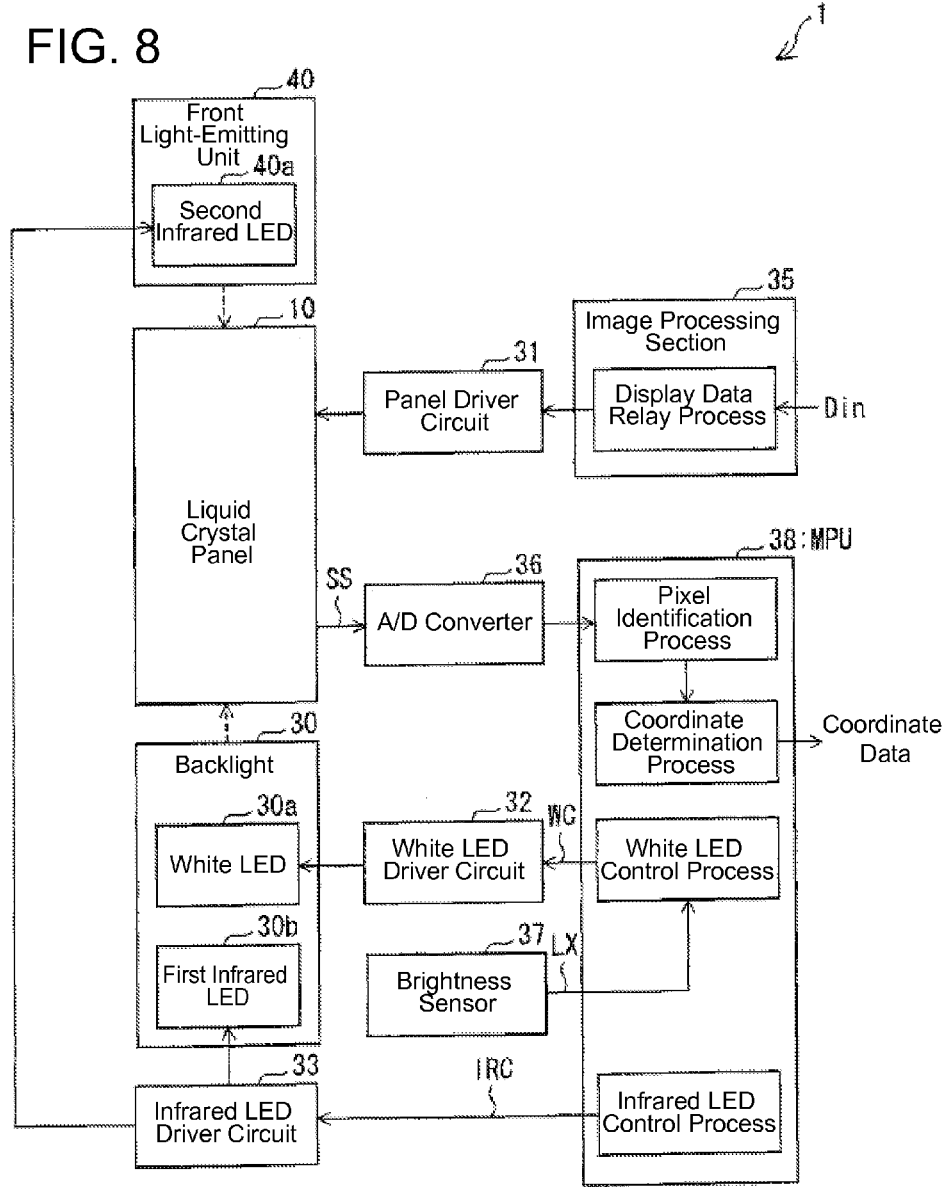
FIG. 8 is a block diagram showing a schematic configuration of the liquid crystal display device of an embodiment of the present invention.

FIG. 8 is a block diagram showing a schematic configuration of the liquid crystal display device 1. The liquid crystal display device 1 includes the liquid crystal panel 10, the backlight 30, a panel driver circuit 31, a white LED driver circuit 32, an infrared LED driver circuit 33, an A/D converter 36, an image processing section 35, a brightness sensor 37, and a microprocessor unit (referred to as an MPU below) 38.

The liquid crystal panel 10 includes a plurality of pixels and a plurality of photo sensors 17 arranged in a matrix (see FIGS. 1 to 3). The liquid crystal display device 1 receives display data Din from an external device (not shown). The received display data Din is supplied to the panel driver circuit 31 via the image processing section 35. The panel driver circuit 31 supplies voltages corresponding to the display data Din to the respective pixels of the liquid crystal panel 10. This way, an image corresponding to the display data Din is displayed on the liquid crystal panel 10 by the respective pixels.

The backlight 30 includes a plurality of white LEDs (Light Emitting Diodes) 30a and a plurality of first infrared LEDs 30b, and emits light (white light and infrared light) to the rear surface of the liquid crystal panel 10. The white LED driver circuit 32 turns on and off a power supply voltage to the white LEDs 30a in accordance with a white LED control signal WC outputted from the MPU 38. In the following description, the white LED driver circuit 32 supplies a power supply voltage when the white LED control signal WC is at a high level, and does not supply the power supply voltage when the white LED control signal WC is at a low level. The white LEDs 30a are turned on during a period when the white LED control signal WC is at a high level, and are turned off during a period when the white LED control signal WC is at a low level.

The infrared LED driver circuit 33 turns on and off a power supply voltage to the first infrared LEDs 30b of the backlight 30 and to the second infrared LEDs 40a of the front light-emitting unit 40 in accordance with an IR control signal IRC outputted from the MPU 38. In the following description, the infrared LED driver circuit 33 supplies a power supply voltage when the IR control signal IRC is at a high level, and does not supply the power supply voltage when the IR control signal IRC is at a low level. The first infrared LEDs 30b and the second infrared LEDs 40a are turned on during a period when the IR control signal IRC is at a high level, and are turned off during a period when the IR control signal IRC is at a low level. The first infrared LEDs 30b and the second infrared LEDs 40a are turned on and off in a synchronized manner in accordance with the IR control signal IRC.

Output signals from the photo sensors 17 are outputted by the liquid crystal panel 10 as sensor output signals SS. The sensor output signals SS, which are analogue signals, are converted into digital signals by the A/D converter 36. Output signals from the A/D converter 36 are signals representing the position identified by infrared light reflected by the subject to be detected. The MPU 38 performs a process of identifying the position of the subject to be detected based on the sensor output signals SS obtained during a sensing period of the coordinate information. The MPU 38 thereafter performs a process of determining coordinates based on the results of the position identification process, and after determining coordinates in an image, which correspond to the position that received the reflection light from the subject to be detected, outputs the determined coordinates as coordinate data.

Figure 9:
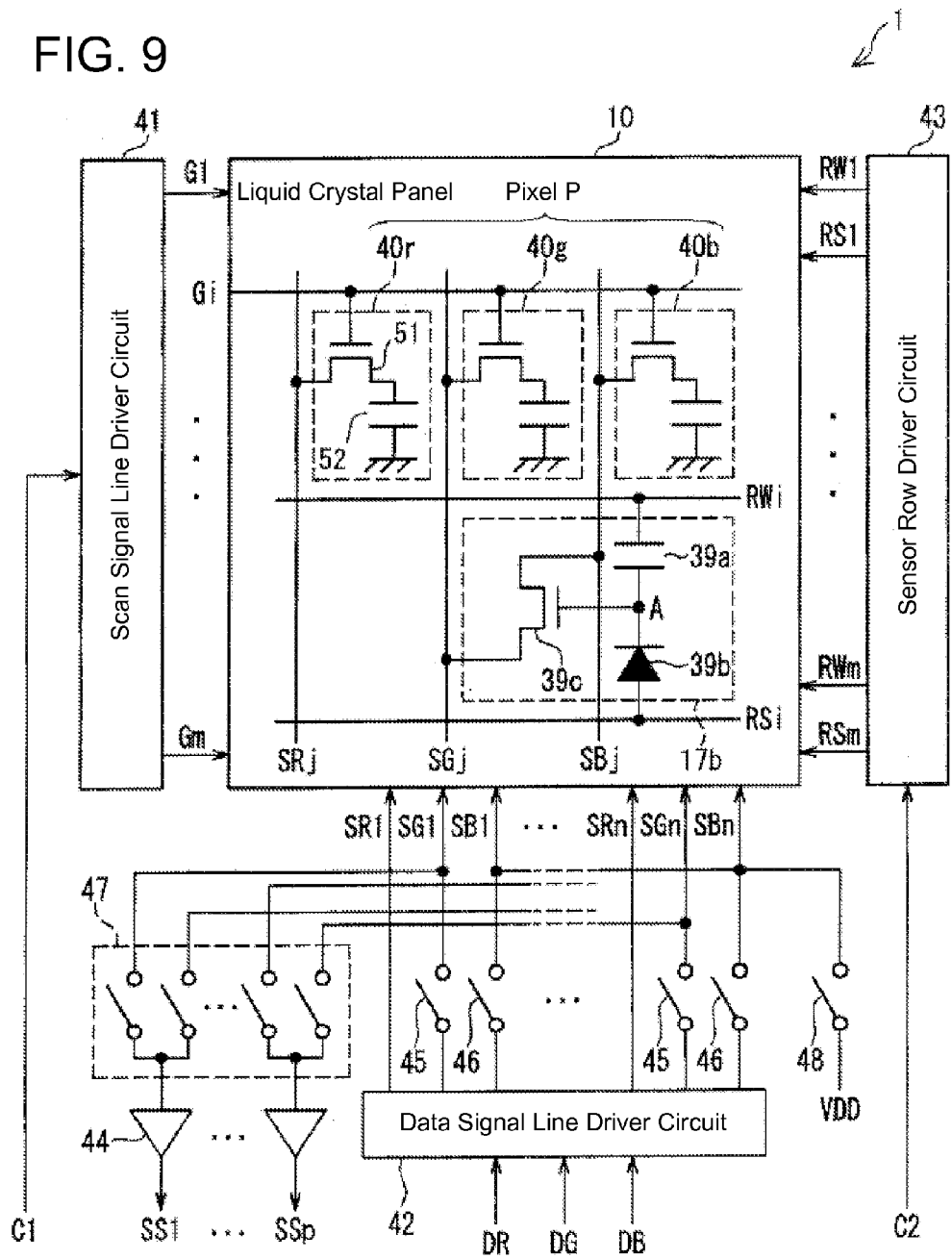
FIG. 9 is a circuit block diagram showing a configuration example of a circuit of the liquid crystal panel and a peripheral circuit thereof in the liquid crystal display device of an embodiment of the present invention.

FIG. 9 is a circuit block diagram showing a configuration example of a circuit of the liquid crystal panel 10 and a peripheral circuit thereof. Here, one pixel is made of three picture elements corresponding to respective colors. That is, as shown in FIG. 9, the pixel P includes a red picture element 40r corresponding to red (R), a green picture element 40g corresponding to green (G), and a blue picture element 40b corresponding to blue (B). A photo sensor 17b is arranged such that a photodiode 39b is located in the same column as the blue picture element 40b. That is, the photo sensor 17b is arranged such that the photodiode 39b is disposed to face the rear surface of the blue filter (see FIGS. 3 and 9).

In other pixels (not shown) than the pixel P shown in FIG. 9, the photo sensors 17 are arranged such that photodiodes 39r are disposed to face the rear surfaces of red filters. Substantially equal number of the photo sensors 17b of the blue picture elements 40b and the photo sensors 17r of the red picture elements 40r are arranged in a prescribed pattern.

FIG. 10(a) is a schematic diagram showing an arrangement example of the photo sensors 17 in this case. In this figure, "R," "G," and "B" respectively represent red picture elements, green picture elements, and blue picture elements, and "S" represents photo sensors. In the pixels Pa and Pc, the photo sensors "S" are disposed in the blue picture elements "B," and in the pixels Pb and Pd, the photo sensors "S" are disposed in the red picture elements "R."

In FIG. 10(a), the photo sensors "S" are alternately disposed in different picture elements in respective horizontal lines, but the arrangement pattern is not limited to such. As shown in FIG. 10(b), for example, the photo sensors "S" may be alternately disposed in different picture elements in respective vertical lines. Alternatively, as shown in FIG. 10(c), the photo sensors "S" may be disposed in different picture elements in respective adjacent pixels. Alternatively, as shown in FIG. 10(d), each pixel may be provided with two photo sensors "S," or as shown in FIG. 10(e), one photo sensor "S" may be provided in each picture element.

Figure 10:
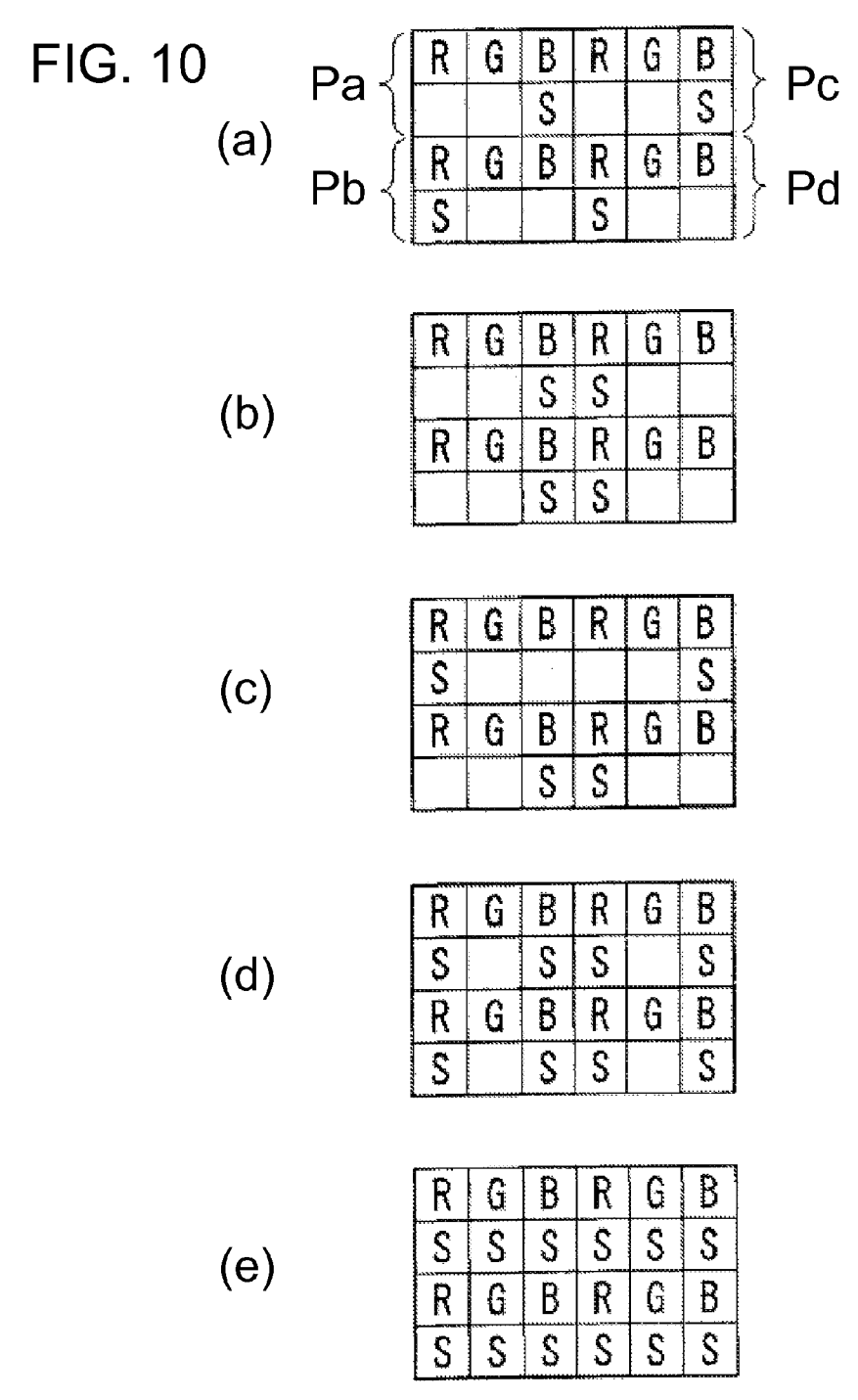

The configuration of the photo sensors 17 is not limited to the configuration shown in FIGS. 3, 9, and 10, where the photo sensors 17 are disposed to face the rear surfaces of the filters corresponding to the respective picture elements. The color filter layer 19 (see FIG. 3) facing the photo sensor 17 may also be a filter (infrared filter) that only transmits infrared light.

Below, an example of an operation of outputting sensor output signals by the photo sensor 17b will be explained. The photo sensor 17b is arranged such that the photodiode 39b thereof is disposed to face the rear surface of the blue filter in the blue picture element 40b of the same column.

As shown in FIG. 9, the liquid crystal panel 10 includes "m" number of scan signal lines G1 to Gm, 3n number of data signal lines SR1 to SRn, SG1 to SGn, SB1 to SBn, (m×3n) number of pixels P (picture elements 40r, 40g, 40b), (m×n) number of photo sensors 17, "m" number of sensor read-out lines RW1 to RWm, and "m" number of sensor reset lines RS1 to RSm.

The scan signal lines G1 to Gm are arranged in parallel with each other. The data signal lines SR1 to SRn, SG1 to SGn, SB1 to SBn are arranged in parallel with each other so as to cross the scan signal lines G1 to Gm at a right angle. The sensor read-out lines RW1 to RWm and the sensor reset lines RS1 to RSm are arranged in parallel with the scan signal lines G1 to Gm.

Pixels P (40r, 40g, 40b) are disposed near respective intersections of the scan signal lines G1 to Gm and the data signal lines SR1 to SRn, SG1 to SGn, SB1 to SBn one by one. The pixels P are arranged two dimensionally (in a matrix) as a whole with "m" in the column direction (vertical direction in FIG. 9) and "3n" in the row direction (horizontal direction in FIG. 9).

As described above, the pixels P are divided into the red picture elements 40r, the green picture elements 40g, and the blue picture elements 40b depending on the colors of the color filters provided therein. The three types of picture elements 40r, 40g, and 40b are arranged side by side in the row direction, and three picture elements constitute one pixel.

The pixel P includes TFTs (Thin Film Transistors) 51 and liquid crystal capacitances 52. The gate terminal of each TFT 51 is connected to the scan signal line Gi ("i" is an integer of 1 or greater but not exceeding "m"), and the source terminal is connected to one of the data signal lines SRj, SGj, and SBj ("j" is an integer of 1 or greater but not exceeding "n"). The drain terminal is connected to a pixel electrode (not shown). The pixel electrode is connected to one electrode of the liquid crystal capacitance 52, and the other electrode of the liquid crystal capacitance 52 is connected to a common electrode. Below, the data signal lines SG1 to SGn connected to the green picture elements 40g are referred to as G data signal lines, and the data signal lines SB1 to SBn connected to the blue picture elements 40b are referred to as B data signal lines. The pixel P may also include an auxiliary capacitance.

The light transmittance (brightness of picture elements) of the pixel P is determined by a voltage written in the pixel P. By applying a high-level voltage (voltage that turns on the TFT 51) to the scan signal line Gi, and by applying a voltage to be written to the data signal line SXj (X is one of R, G, and B), the voltage can be written into the pixel P that is connected to the scan signal line Gi and the data signal line SXj. By writing a voltage corresponding to the display data Din into the pixel P, the brightness of the picture elements can be set to a desired level.

The photo sensor 17 is constituted of a capacitor 39a, the photodiode 39b, and a sensor preamplifier 39c.

One electrode of the capacitor 39a is connected to the cathode terminal of the photodiode 39b (this connecting point is referred to as a node A below). The other electrode of the capacitor 39a is connected to the sensor read-out line RWi, and the anode terminal of the photodiode 39b is connected to the sensor reset line RSi. The sensor preamplifier 39c is constituted of a TFT having the gate terminal connected to the node A, the drain terminal connected to the B data signal line SBj, and the source terminal connected to the G data signal line SGj.

Figure 11:
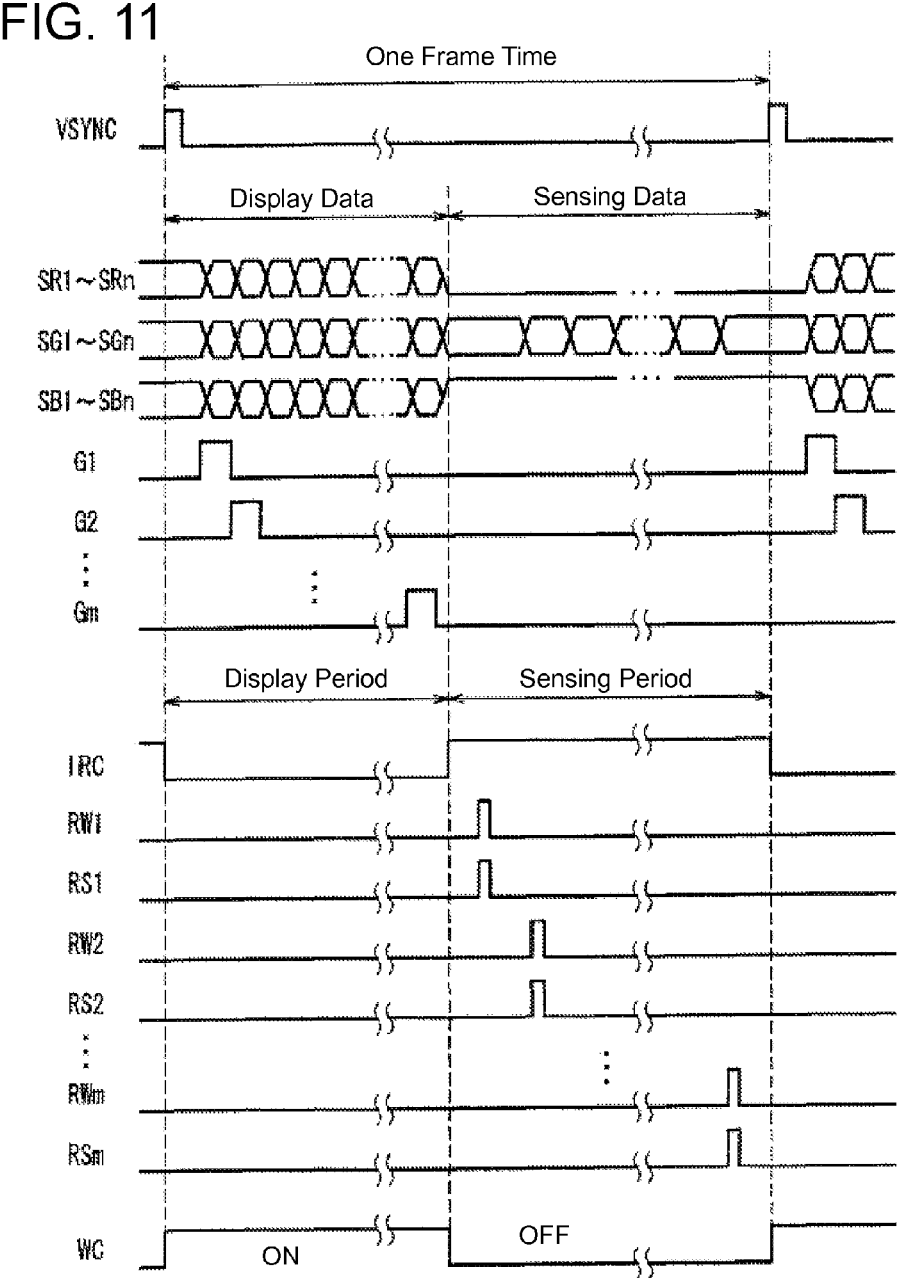
FIG. 11 is a timing chart showing an operation of the liquid crystal display device of an embodiment of the present invention.

In order to detect a light intensity by the photo sensor 17 connected to the sensor read-out line RWi, the B data signal line SBj, and the like, a prescribed voltage is applied to the sensor read-out line RWi and to the sensor reset line RSi, and a power supply voltage VDD is applied to the B data signal line SBj at a timing represented by the timing chart shown in FIG. 11. Specifically, when light is incident on the photodiode 39b after the sensor read-out line RWi and the sensor reset line RSi are provided with a prescribed voltage, electric current corresponding to the incident light intensity flows through the photodiode 39b, causing the voltage of the node A to lower by the size of the current that flowed. When the power supply voltage VDD is applied to the B data signal line SBj, the voltage of the node A is amplified by the sensor preamplifier 39c, and the amplified voltage is outputted to the G data signal line SGj. Therefore, based on the voltage at the G data signal line SGj, the light intensity detected (received) by the photo sensor 17 can be obtained.

As shown in FIG. 9, in the periphery of the liquid crystal panel 10, a scan signal line driver circuit 41, a data signal line driver circuit 42, a sensor row driver circuit 43, "p" ("p" is an integer of 1 or greater but not exceeding "n") number of sensor output amplifiers 44, and a plurality of switches 45 to 48 are provided. The scan signal line driver circuit 41, the data signal line driver circuit 42, and the sensor row driver circuit 43 correspond to the panel driver circuit 31 in FIG. 8.

The data signal line driver circuit 42 has 3n number of output terminals, corresponding to the 3n number of data signal lines. Between each of the G data signal lines SG1 to SGn and each of the "n" number of output terminals corresponding thereto, one switch 45 is provided. Between each of the B data signal lines SB1 to SBn and each of the "n" number of output terminals corresponding thereto, one switch 46 is provided. The G data signal lines SG1 to SGn are divided into groups of "p" number, and between the k-th ("k" is an integer of 1 or greater, but not exceeding "p") G data signal line in each group and the input terminal of the k-th sensor output amplifier 44, one switch 47 is provided. The B data signal lines SB1 to SBn are all connected to one end of the switch 48, and the other end of the switch 48 is applied with the power supply voltage VDD. FIG. 9 includes "n" number of switches 45 to 47, respectively, and one switch 48.

The present liquid crystal display device 1 performs different operations between a display period and a sensing period. In the display period, the switches 45 and 46 are turned on, and the switches 47 and 48 are turned off. On the other hand, in the sensing period, the switches 45 and 46 are turned off, the switch 48 is turned on, and the switches 47 are turned on in a time-shared manner such that the G data signal lines SG1 to SGn are sequentially connected to the input terminals of the sensor output amplifiers 44 group by group.

During the display period shown in FIG. 11, the scan signal line driver circuit 41 and the data signal line driver circuit 42 are operated. In accordance with a timing control signal C1 (see FIG. 9), the scan signal line driver circuit 41 selects one scan signal line per one line time from the scan signal lines G1 to Gm, applies a high-level voltage to the selected scan signal line, and applies a low-level voltage to the rest of the scan signal lines. The data signal line driver circuit 42 drives the data signal lines SR1 to SRn, SG1 to SGn, SB1 to SBn line-sequentially in accordance with the display data DR, DG, and DB outputted from the image processing section 35. More specifically, the data signal line driver circuit 42 stores the display data DR, DG, and DB for at least one line each, and applies a voltage corresponding to the display data for one line to the data signal lines SR1 to SRn, SG1 to SGn, SB1 to SBn per one line time. Alternatively, the data signal line driver circuit 42 may drive the data signal lines SR1 to SRn, SG1 to SGn, SB1 to SBn dot-sequentially.

During the sensing period shown in FIG. 11, the sensor row driver circuit 43 and the sensor output amplifiers 44 are operated. In accordance with a timing control signal C2 (see FIG. 9), the sensor row driver circuit 43 selects one signal line each from the sensor read-out lines RW1 to RWm and from the sensor reset lines RS1 to RSm per one line time, applies prescribed read-out voltage and reset voltage to the selected sensor read-out line and to the selected sensor reset line, respectively, and applies a voltage different from the voltage applied to the selected lines to the rest of the signal lines. Typically, the lengths of time for processing one line differ between the display period and the sensing period. The sensor output amplifiers 44 amplify the voltages selected by the switches 47, and output the voltages as the sensor output signals SS1 to SSp.

In FIG. 11, the white LED control signal WC is set to a high level during the display period, and is set to a low level during the sensing period. In this case, the white LEDs 30a (see FIG. 8) of the backlight 30 are turned on during the display period, and are turned off during the sensing period. This way, it is possible to make the photodiode 39b less likely to be affected by light from the backlight. Alternatively, it can be configured such that the white LEDs 30a are always on. In this configuration, the white LED control signal WC stays at the high level.

The IR control signal IRC is set to a low level during the display period, and is set to a high level during the sensing period. In this case, the first infrared LEDs 30b of the backlight 30 and the second infrared LEDs 40a of the front light-emitting unit 40 (see FIG. 8) are turned off during the display period, and are turned on during the sensing period. This way, it is possible to make the photodiode 39b less likely to be affected by white light (visible light).

Figure 12:
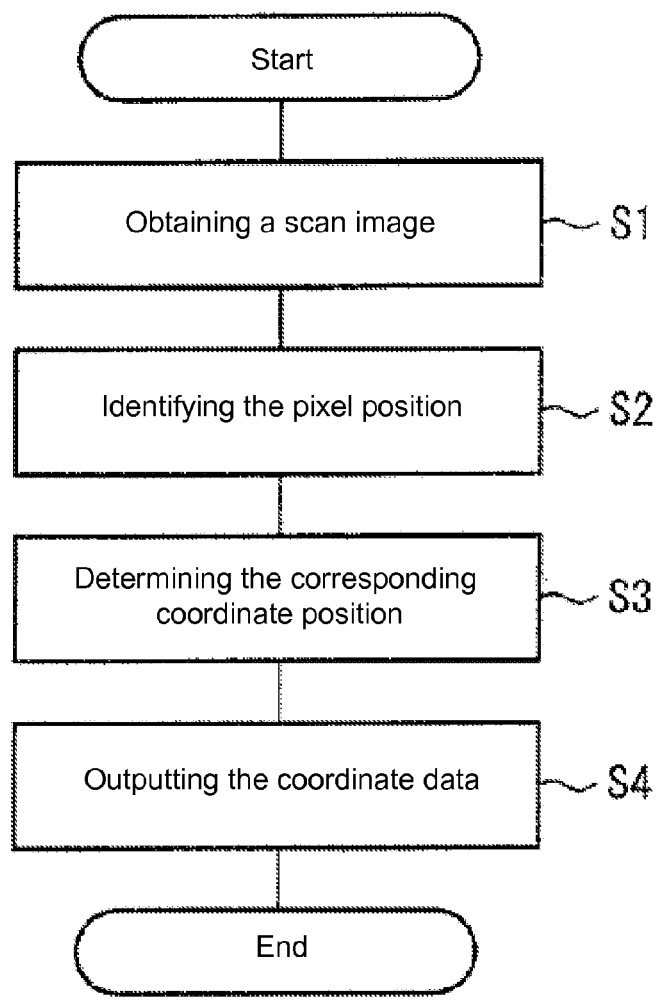
FIG. 12 is a flowchart showing an example of a process of identifying a position radiated by reflection light from a subject to be detected in the liquid crystal display device of an embodiment of the present invention.

FIG. 12 is a flowchart showing an example of a process of identifying a position where the reflected light from a subject to be detected is incident on in the liquid crystal display device 1. The process shown in FIG. 12 is performed within one frame time by the MPU 38 shown in FIG. 8.

The A/D converter 36 (see FIG. 8) converts analog output signals SS outputted from the photo sensors 17 provided in the liquid crystal panel 10 into digital signals. When the position detection is performed by using reflection light reflected by a subject to be detected, for example, the output signals SS from the photo sensors 17 arranged so as to correspond to the blue picture elements are converted into digital signals.

The MPU 38 obtains the digital signals as a scan image (step S1), and thereafter performs a process of identifying the pixel position with respect to the obtained scan image (step S2).

Figure 13:
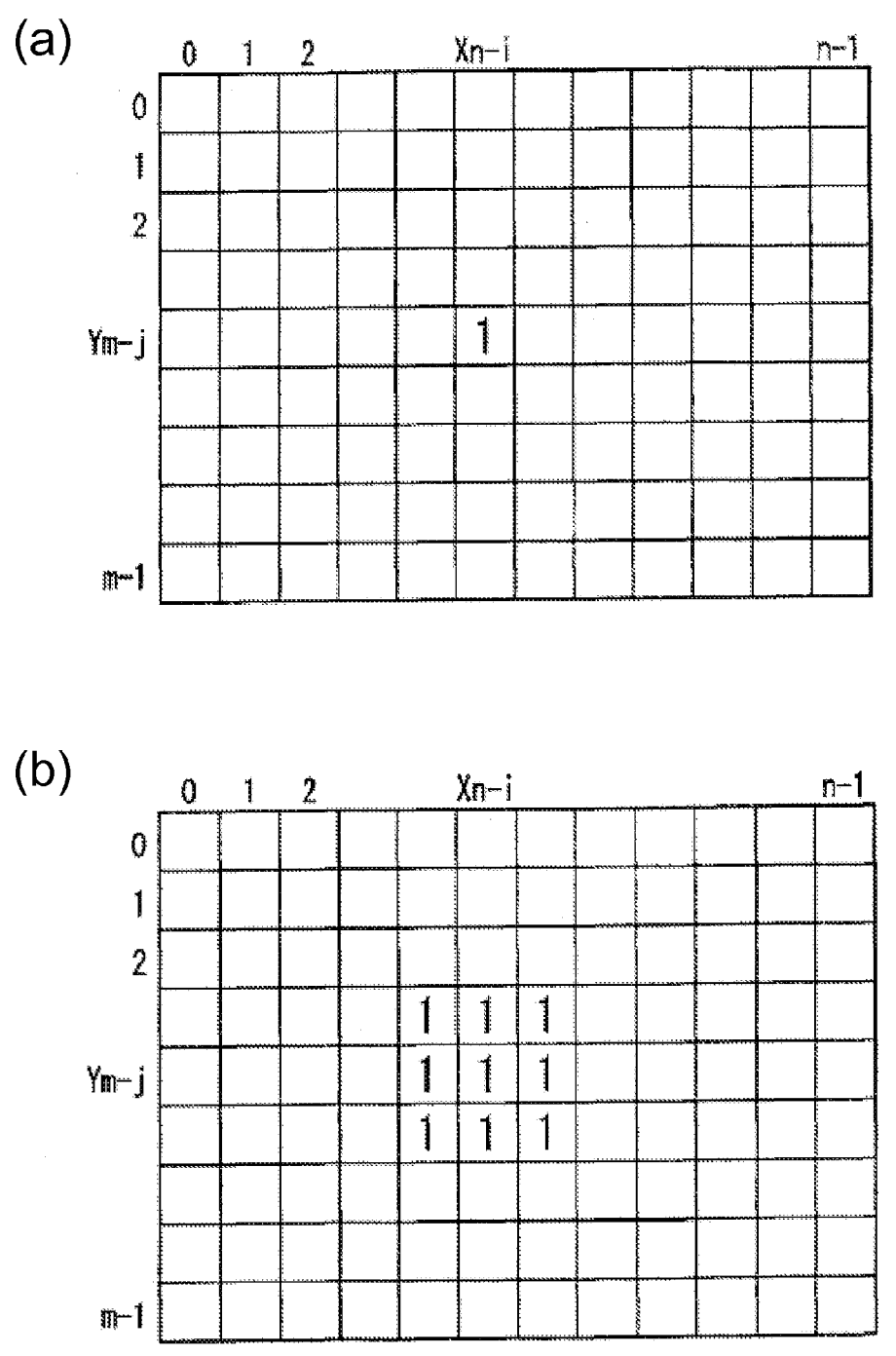

FIG. 13(*a*) is a schematic diagram of a scan image when the pixel number is m×n, for example. As shown in this figure, when the scan image is shown as a binary image based on a prescribed threshold value, it is determined that a pixel with the value "1" is the pixel that received the reflection light, and the pixel position of this pixel is identified. In this figure, the pixel position (Xn-i, Ym-j) is identified.

On the other hand, FIG. 13(*b*) shows a scan image when the reflection light has a large radiation range, and is thereby incident on a plurality of pixels. The pixel positions identified in this case include eight pixels that surround the pixel position (Xn-i, Ym-j). The scan image in this figure can be obtained in the arrangement pattern shown in FIG. 10(*d*) or 10(*e*).

When the pixel position is identified, the MPU 38 performs a process of determining a coordinate position in the image, which corresponds to the identified pixel (step S3). As shown in FIG. 13(*a*), for example, coordinates that correspond to the identified pixel position (Xn-i, Ym-j) are determined. When both of the image resolution of the display image and the screen resolution of the liquid crystal panel are "m×n," and coincide with each other, it is determined that the pixel position (Xn-i, Ym-j) is the coordinate position. When the image resolution and the screen resolution do not coincide with each other, a coordinate position corresponding to the pixel position can be determined through coordinate conversion.

When nine pixel positions including the pixel position (Xn-i, Ym-j) are identified as shown in FIG. 13(*b*), the coordinate position can be determined in accordance with prescribed rules. For example, the coordinate position can be determined based on the pixel that is closest to the center of the identified pixels. In this case, as shown in FIG. 13(*b*), the corresponding coordinates can be determined based on the pixel position (Xn-I, Ym-j), which is the center of the plurality of pixels having the value "1." Alternatively, coordinates corresponding to all of the pixel positions having the value "1" in this figure can be determined as the coordinate positions.

Figure 14:
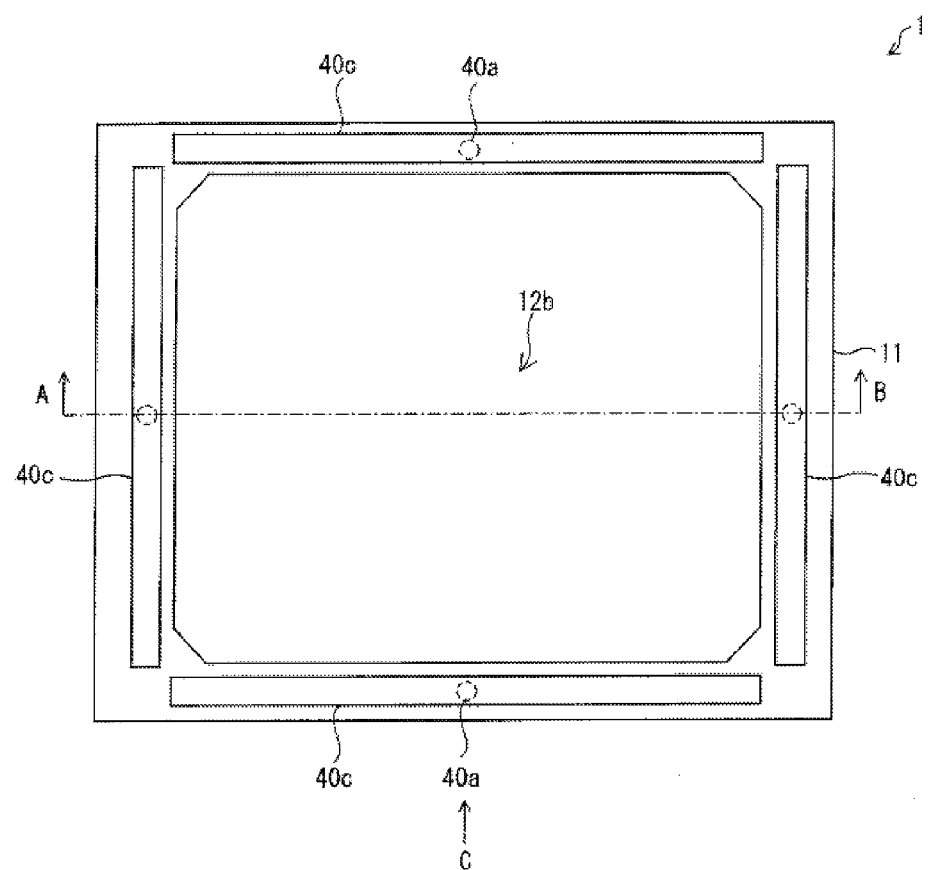
FIG. 14 is a plan view showing another configuration of the liquid crystal display device of an embodiment of the present invention.
Figure 15:
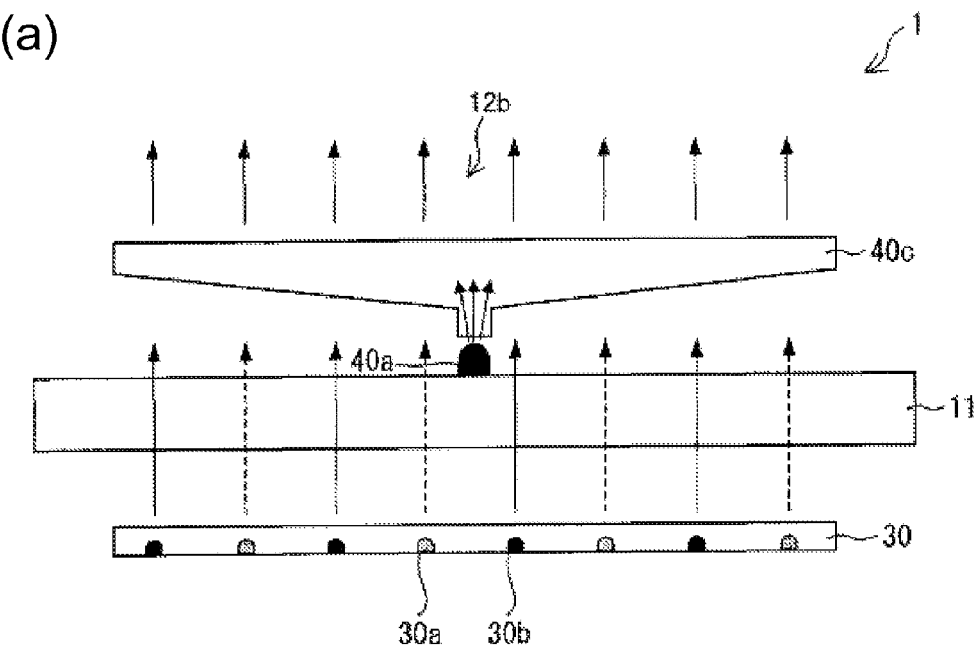
FIG. 15(a) is a cross-sectional view along the line A-B in FIG. 14.
FIG. 15(b) is a view from the arrow C in FIG. 14.
Figure 15:
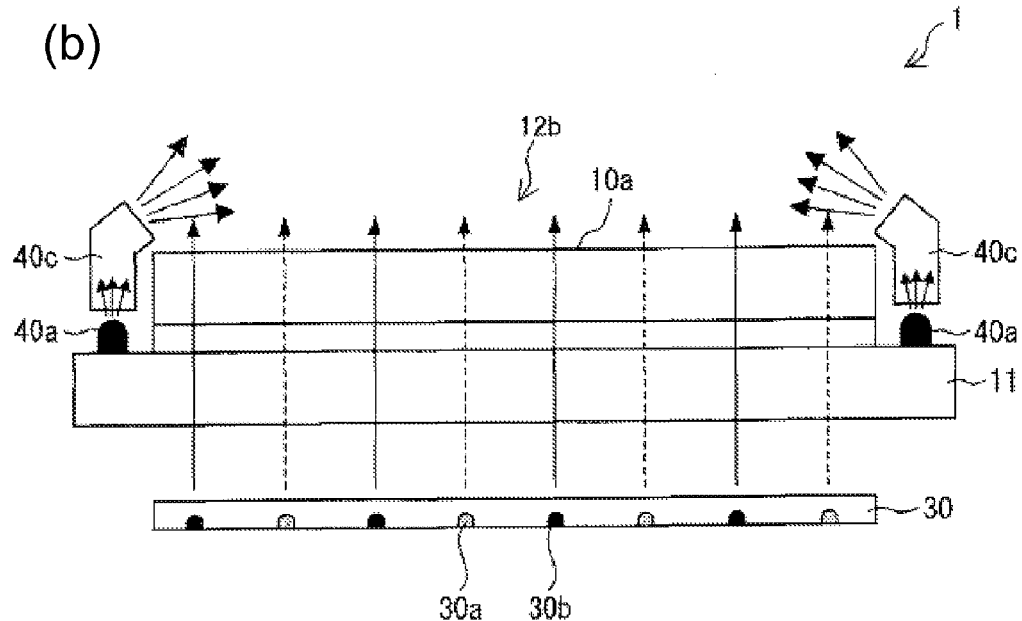

Next, another configuration of the front light-emitting unit 40 in a liquid crystal display device 1 of the present invention will be explained. In FIGS. 1 and 2, the second infrared light sources 40*a* of the front light-emitting unit 40 are disposed at the respective corners (four corners) in the periphery of the image display region 12*b* on the side surface 12*a* of the opposite substrate 12, but the front light-emitting unit 40 of the present embodiment is not limited to such, and a configuration shown in FIGS. 14, 15(*a*), and 15(*b*) is also possible. FIG. 14 is a plan view showing another configuration of the liquid crystal display device 1. FIG. 15(*a*) is a view from the arrow C in FIG. 14, and FIG. 15(*b*) is a cross-sectional view along the line A-B in FIG. 14. In this configuration, the front light-emitting unit 40 has light guides 40*c* (light guide members) in addition to the second infrared light sources 40*a*. As shown in FIGS. 14 and 15, the second infrared light source 40*a* is disposed in the center of each side surface 12*a* of the opposite substrate 12. The light guides 40*c* are arranged such that one end surfaces face the respective emitting surfaces of the second infrared light sources 40*a* and such that end portions having the other end surfaces surround the opposite substrate 12. Further, the emitting surfaces of the light guides 40*c* are set such that the optical axis of emitted light forms 45 degrees with the image display surface 10*a*, for example.

Figure 16:
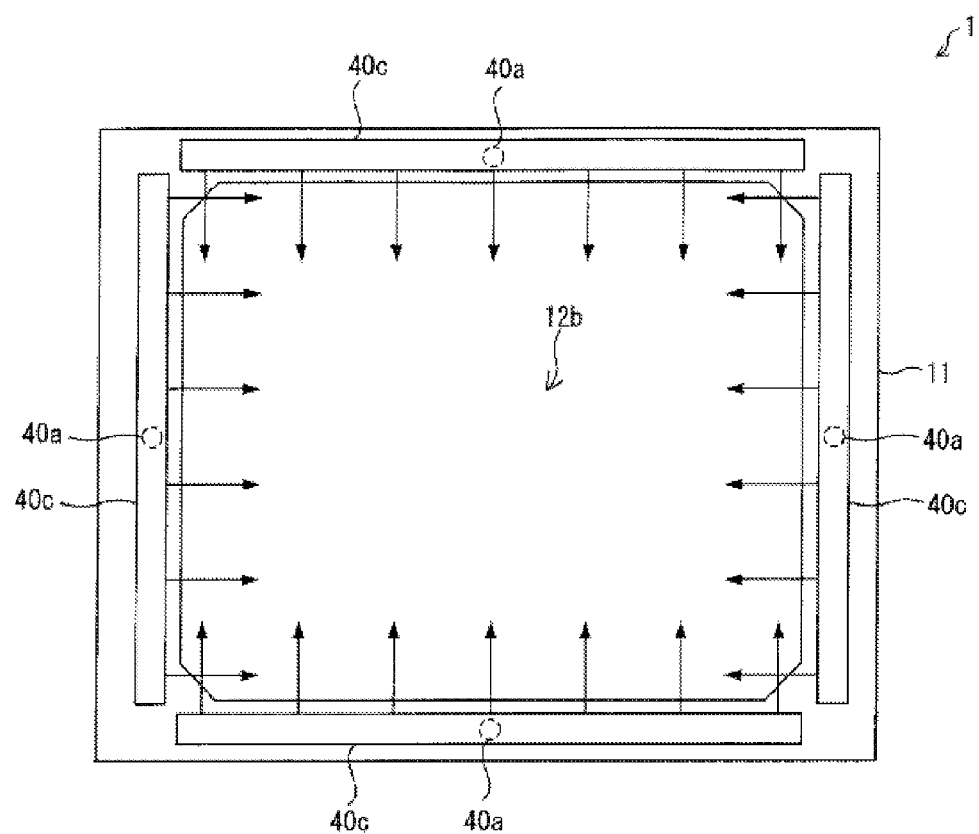
FIG. 16 is a plan view schematically showing how light travels in the liquid crystal display device shown in FIG. 14.

According to this configuration, infrared light emitted from the second infrared light sources 40*a* travels inside the light guides 40*c*, exits through the emitting surfaces of the light guides 40*c*, and enters the image display region 12*b* without going through (passing through) the liquid crystal panel 10. FIG. 16 shows how light travels in the liquid crystal display device 1 having the above-mentioned configuration. As shown in this figure, uniform infrared light can be emitted to the image display region 12*b* from the periphery of the opposite substrate 12, and therefore, the position of a subject to be detected can be identified more accurately regardless of the position thereof in the horizontal direction (position in the X-Y plane that is parallel with the image display surface 10*a*).

Figure 17:
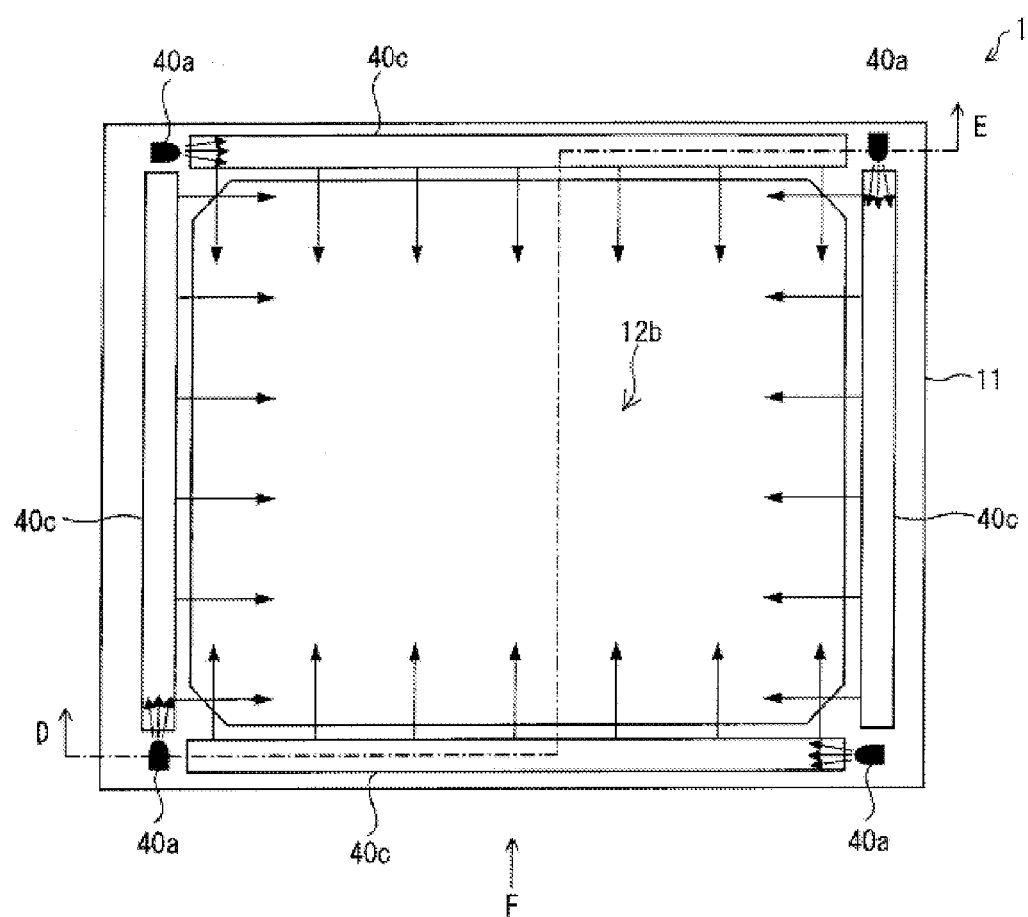
FIG. 17 is a plan view showing yet another configuration of the liquid crystal display device of an embodiment of the present invention.
Figure 18:
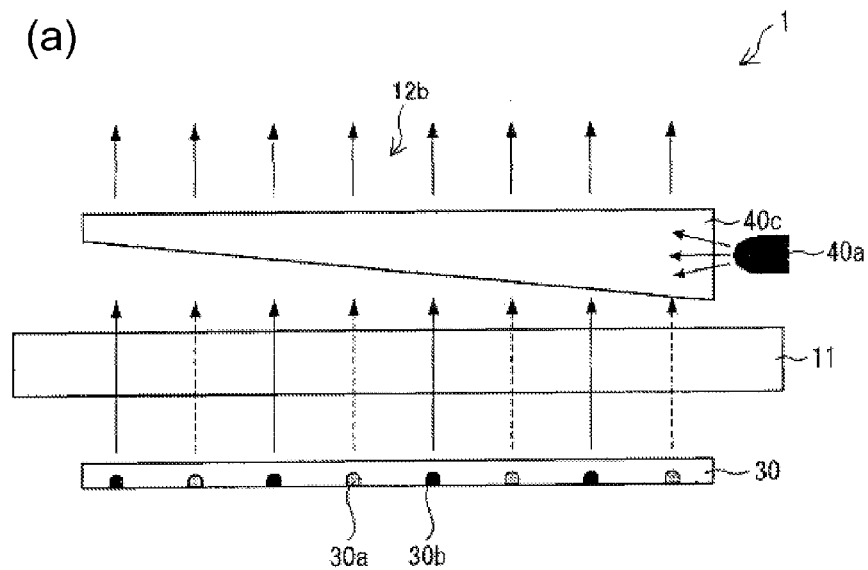
FIG. 18(a) is a cross-sectional view along the line D-E in FIG. 17.
FIG. 18(b) is a view from the arrow F in FIG. 17.
Figure 18:
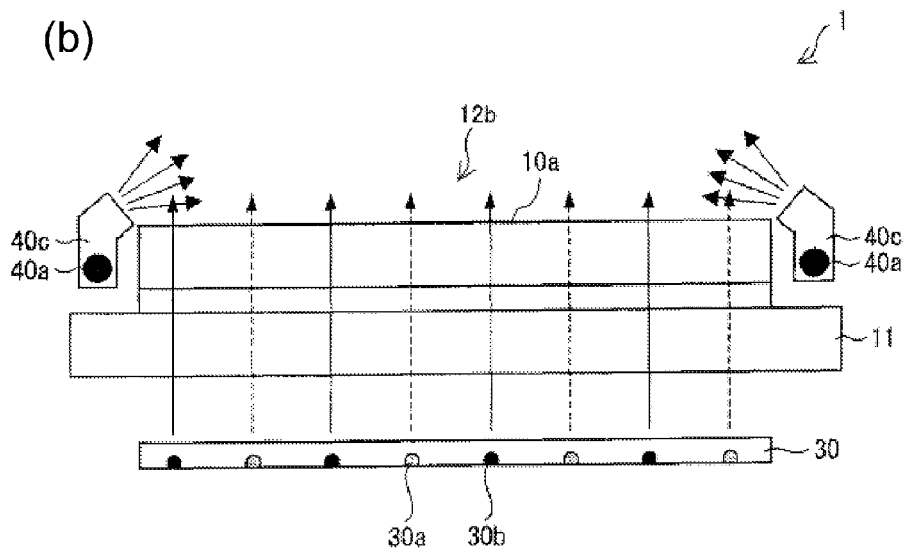

There is no special limitation on the shape of the light guides 40*c* shown in FIGS. 14 and 15, and the shape shown in FIGS. 17, 18(*a*), and 18(*b*), for example, can also be employed as another configuration. FIG. 17 is a plan view showing another configuration of the liquid crystal display device 1. FIG. 18(*a*) is a view from the arrow F in FIG. 17, and FIG. 18(*b*) is a cross-sectional view along the line D-E in FIG. 17. In this configuration, the second infrared light sources 40*a* are disposed at the respective corners (four corners) in the periphery of the image display region 12*b* in a manner similar to FIGS. 1 and 2, and infrared light that enters through light-receiving end portions (side surfaces) of the respective light guides 40*c* travels therein while reflecting internally, and is emitted through emitting surfaces (top surfaces) of the light guides 40*c* toward the image display region 12*b*.

Figure 19:
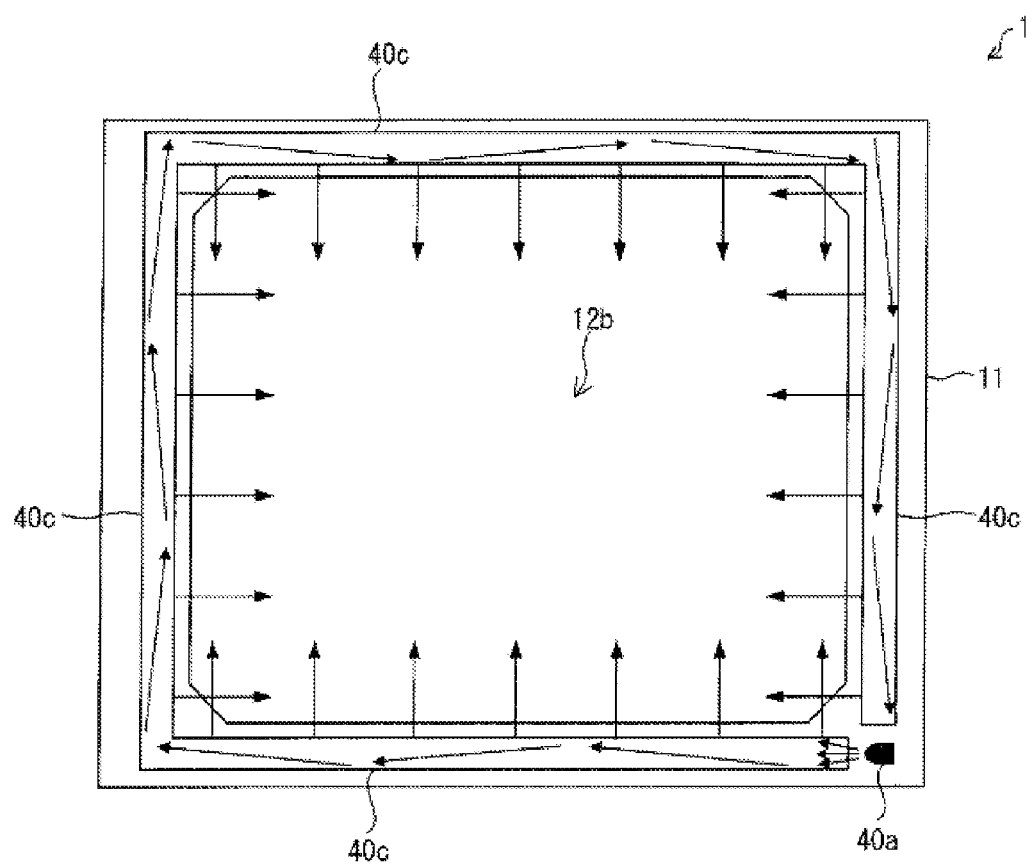
FIG. 19 is a plan view schematically showing how light travels in the liquid crystal display device shown in FIG. 17.

In the respective configurations described above, four second infrared light sources 40*a* are provided, but another configuration having a single second infrared light source 40*a* is also possible. In this case, as shown in FIG. 19, infrared light emitted from the single second infrared light source 40*a* is incident on the light guide 40*c* that is formed as a single component surrounding the image display region 12*b*, and this incident light is emitted to the image display region 12*b* through the emitting surfaces in the four sides of the light guide 40*c* after travelling inside the light guide 40*c* while repeatedly reflecting therein.

The configuration of the liquid crystal display device 1 of embodiments of the present invention is not limited to a configuration performing planar (2D: Two Dimension) image display, and it can also be configured to perform stereoscopic (3D: Three Dimension) image display.

In the liquid crystal display device displaying 3D images, in order to supply images having different points of view to left and right eyes of the viewer, respectively, an image for the left eye and an image for the right eye on the display screen are encoded by colors, optical polarizing states, or display times, for example, and are separated by a glasses-like filter system that the viewer wears, thereby supplying each eye with the corresponding image only.

Figure 20:
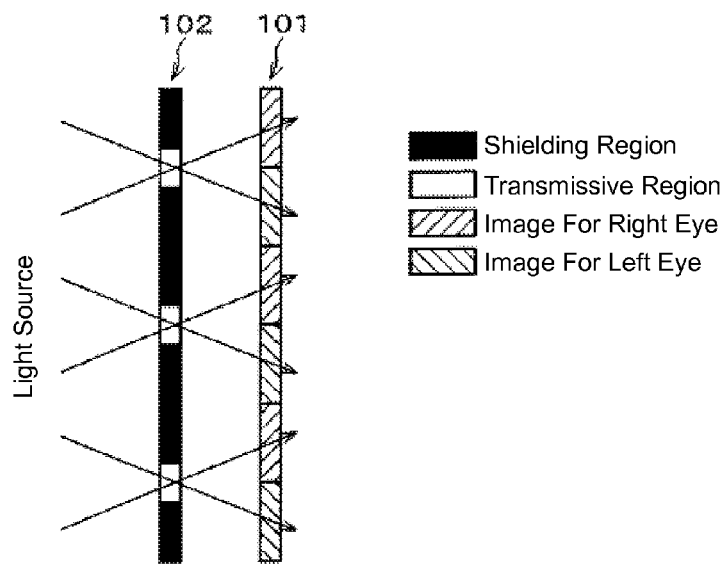
FIG. 20 shows a principle of 3D display in a liquid crystal display device using a parallax barrier.
Figure 20:
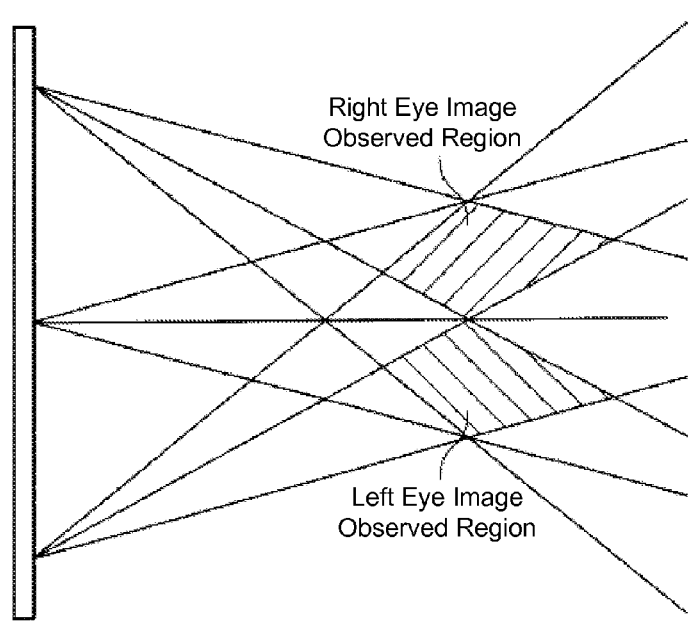
Figure 21:
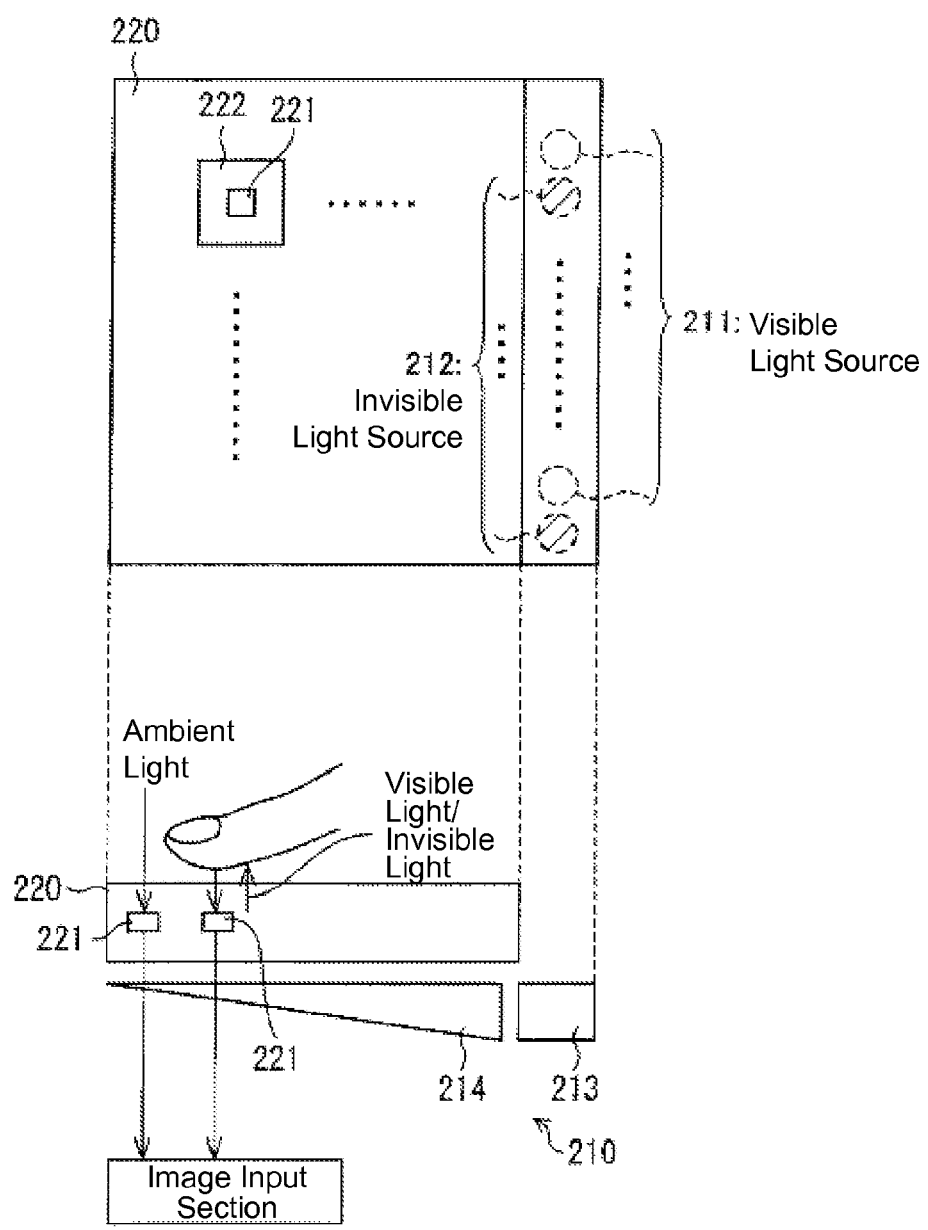
FIG. 21 shows a schematic configuration of a primary part of a liquid crystal display device described in Patent Document 1.

Alternatively, the liquid crystal display device may be configured such that the liquid crystal panel thereof is provided with a parallax barrier in which light transmissive regions and light-shielding regions are formed in a stripe pattern. This way, 3D images can be perceived by the viewer without a visual aid tool such as a filter system. FIG. 20 shows a principle of the 3D display in a liquid crystal display device using a parallax barrier. FIG. 20(*a*) shows an effect of the parallax barrier providing the viewing angles, and FIG. 20(*b*) shows observed regions on a 3D display screen. According to this configuration, specific viewing angles are respectively provided by a parallax barrier 102 to an image for right eye and an image for left eye that are generated by a liquid crystal panel 101 (see FIG. 20(a)), which allows each eye to perceive the corresponding image only in a specific observed region in space. As a result, 3D image is recognized by the viewer (see FIG. 20(b)).

The liquid crystal display device 1 of an embodiment of the present invention may also be configured to have a function of switching a display mode between planar (2D) display (first display mode) and stereoscopic (3D) display (second display mode).

Switching the display mode between 2D and 3D in the liquid crystal display device equipped with a parallax barrier can be achieved by providing a switch for disabling and enabling the parallax barrier function using a switching liquid crystal layer or the like such that 3D display and 2D display are electrically switched, for example. That is, in this liquid crystal display device, the switching liquid crystal layer is turned ON and OFF, and when the parallax barrier function is thereby enabled, 3D display is performed, and when the parallax barrier function is thereby disabled, 2D display is performed.

In the liquid crystal display device of such an embodiment, there is no special limitation on the configuration for performing 2D display and 3D display, and any known techniques can be employed.

In the present liquid crystal display device 1, it is possible to accurately identify the position of a subject to be detected (such as a finger of the user of the liquid crystal display device) even in a region remote from the image display surface 10a of the liquid crystal panel 10, and therefore, when the user recognizes a 3D image and gives an instruction thereto using a finger, the position thereof can be accurately identified as intended by the user. Thus, the liquid crystal display device 1 of the present invention can be suitably used for configurations performing 3D display.

As another configuration, the present liquid crystal display device may be configured to display different images in different directions; more specifically, to perform a so-called dual view display, veil view display, or triple view display.

In the present embodiment, a liquid crystal display device has been described as an example of the display device, but the present embodiment is not limited to this, and an electroluminescence (EL) display device may also be used as the display device.

The present invention is not limited to each embodiment above, and various modifications can be made without departing from the scope defined by the claims. Embodiments that can be obtained by appropriately combining techniques disclosed in respective different embodiments are also included in the technical scope of the present invention.

INDUSTRIAL APPLICABILITY

The present invention can be suitably used for a touch panel-equipped 3D display device with built-in photo sensors.

DESCRIPTIONS OF REFERENCE CHARACTERS 1 liquid crystal display device (display device)
10 liquid crystal panel (display panel)
10a image display surface
11 active matrix substrate (TFT substrate)
12 opposite substrate (color filter (CF) substrate)
12a side surface (of opposite substrate)
12b image display region
13 liquid crystal layer
14a (front side) polarizing plate
14b (rear side) polarizing plate
15 glass substrate (in TFT substrate)
16 alignment film (in TFT substrate)
17 photo sensor (light-receiving element)
18 glass substrate (in CF substrate)
19 color filter layer
20 opposite electrode
21 alignment film (in CF substrate)
22 black matrix
23 pixel electrode
24 data signal line
30 backlight (first light-emitting unit)
30a visible light source, white LED
30b first infrared light source, first infrared LED (first light source)
31 panel driver circuit
32 white LED driver circuit
33 infrared LED driver circuit
35 image processing section
36 A/D converter
37 brightness sensor
38 microprocessor unit (MPU)
39a capacitor
39b photodiode
39c sensor preamplifier
40 front light-emitting unit (second light-emitting unit)
40a second infrared light source, second infrared LED (second light source)
40c light guide (light guide member)
41 scan signal line driver circuit
42 data signal line driver circuit
43 sensor row driver circuit
44 sensor output amplifier
51 TFT (transistor)
52 liquid crystal capacitance
P pixel

The invention claimed is:

1. A display device having a function of identifying a position of a subject to be detected in an image display region of a display panel by radiating light to the image display region and by detecting light reflected by the subject to be detected, the display device comprising: a first light-emitting unit and a second light-emitting unit that radiate light to the image display region, wherein the first light-emitting unit is disposed on a side opposite to an image display surface of the display panel, and radiates light to the image display region from a rear surface side of the display panel, and wherein the second light-emitting unit is disposed outside of the image display region, and radiates light to the image display region without having the display panel therebetween, wherein the first light-emitting unit comprises a light source for image display and a first light source that emits light to the image display region for identifying a position of a subject to be detected, wherein the second light-emitting unit comprises at least one second light source that emits light to the image display region for identifying a position of a subject to be detected.

2. The display device according to claim 1, wherein the second light-emitting unit comprises a plurality of said second light sources, and
   wherein said second light sources are respectively disposed at respective corners in a periphery of the image display region.

3. The display device according to claim 2, wherein the respective second light sources are disposed such that light emitted from said second light sources travels across the image display region.

4. The display device according to claim 1, wherein the second light-emitting unit further comprises a light guide member outside of the image display region,
   wherein the second light source emits light to the light guide member, and
   wherein the light guide member emits light that was emitted from the second light source to the image display region through an emitting surface of said light guide member.

5. The display device according to claim 4, wherein the light guide member is disposed along each side of the image display region so as to enclose the image display region.

6. The display device according to claim 1, wherein the first light source is an infrared light source that radiates infrared light.

7. The display device according to claim 1, wherein the second light source is an infrared light source that radiates infrared light.

8. The display device according to claim 1, wherein the display panel displays a stereoscopic image.

9. The display device according to claim 1, wherein the display panel switches a display mode between a first display mode in which a planar image is displayed and a second display mode in which a stereoscopic image is displayed.

10. The display device according to claim 1, wherein a position of the subject to be detected that is present at a position remote from the display panel in the image display region is identified by detecting light that was emitted from the first light-emitting unit and the second light-emitting unit and that was reflected by the subject to be detected.

* * * * *